United States Patent [19]

Ebato

[11] Patent Number: 5,470,188

[45] Date of Patent: Nov. 28, 1995

[54] LIFT FOR LOADING AND UNLOADING A TRUCK

[75] Inventor: Hiroshi Ebato, Tokorozawa, Japan

[73] Assignee: EBAC Corporation, Tokorozawa, Japan

[21] Appl. No.: 44,153

[22] Filed: Apr. 8, 1993

[51] Int. Cl.$^6$ .................................................. B60P 1/26
[52] U.S. Cl. ................................ 414/545; 414/540
[58] Field of Search .................................. 414/540, 545, 414/522, 537

[56] References Cited

U.S. PATENT DOCUMENTS

| | | | |
|---|---|---|---|
| 586,641 | 7/1897 | Underwood | 414/545 |
| 1,369,011 | 2/1921 | Duconda | 414/540 |
| 2,391,310 | 12/1945 | Heller | 414/522 |
| 2,635,771 | 4/1953 | Black | 414/540 |
| 3,540,607 | 11/1970 | Mandel | 414/537 |
| 4,850,788 | 7/1989 | Dickson | 414/537 |

FOREIGN PATENT DOCUMENTS

| | | | |
|---|---|---|---|
| 628644 | 3/1936 | Germany | 414/545 |
| 164240 | 9/1984 | Japan | 414/545 |

*Primary Examiner*—Michael S. Huppert
*Assistant Examiner*—Thomas J. Brahan
*Attorney, Agent, or Firm*—Spencer, Frank & Schneider

[57] ABSTRACT

A lift for loading and unloading a truck. The truck has a loading chamber, a rear body portion and a chassis frame, and the lift has support posts mounted at an end and at each side of the truck at the rear body portion. A connecting member connecting the lower ends of each support post is provided. A drive moves the support posts in an upward and downward direction. A lift table has an opening formed in a portion corresponding to the chassis frame. The lift table is supported by the connecting member and is slidable on the connecting member in a longitudinal direction to the loading chamber thereby traversing the connecting member.

23 Claims, 33 Drawing Sheets

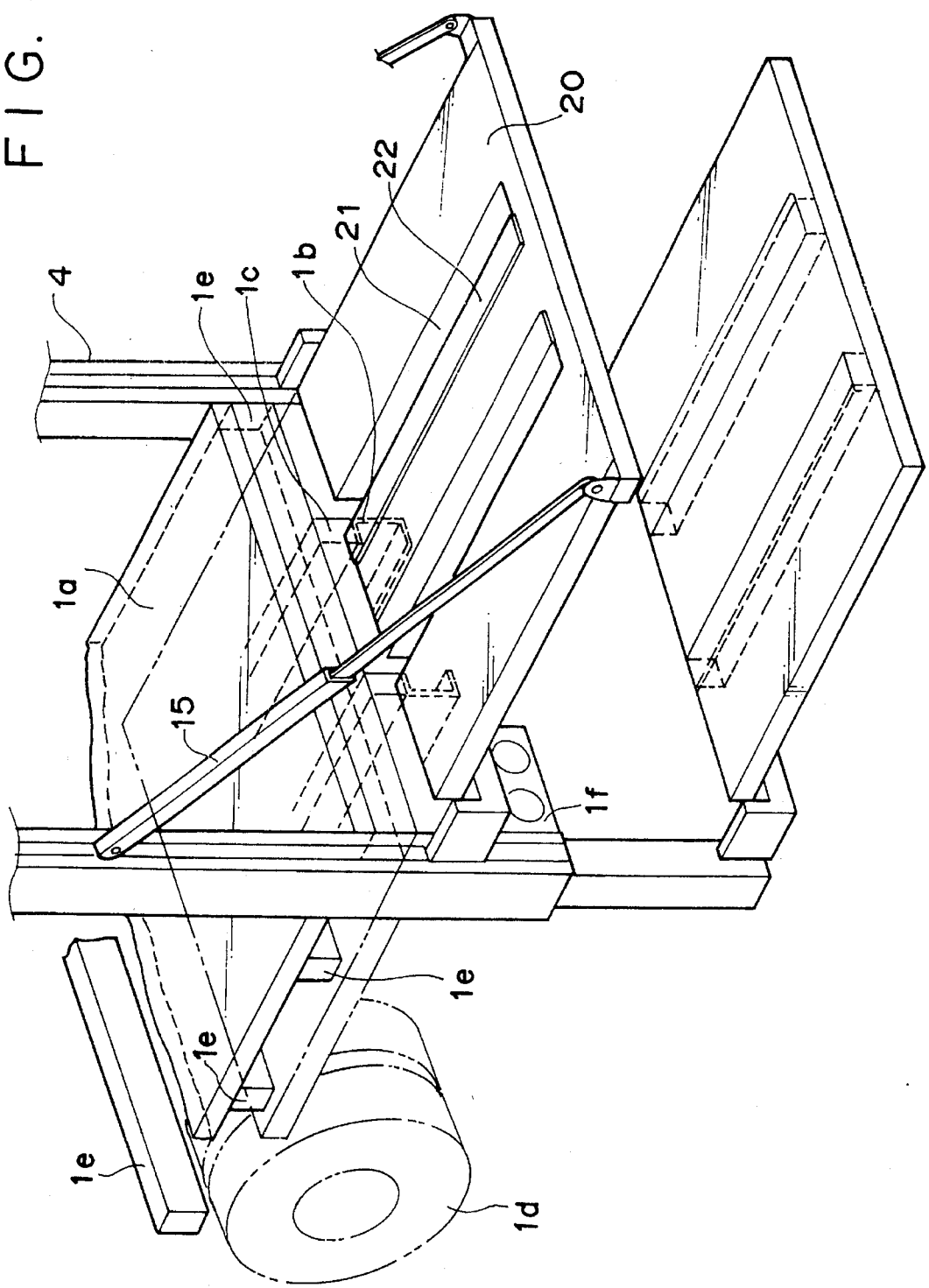

Prior Art
FIG. 12(a)
Prior Art
FIG. 12(b)
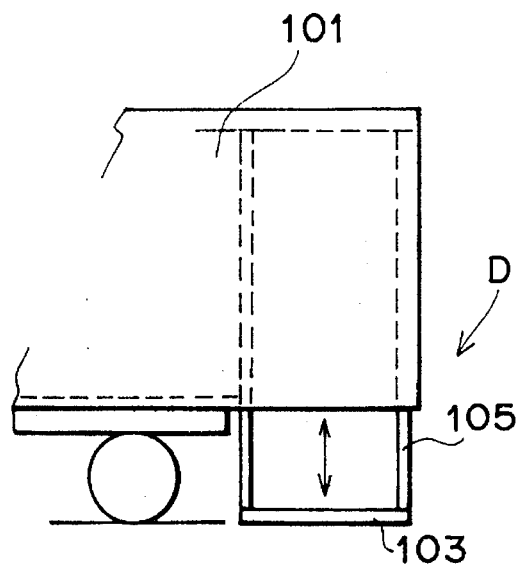
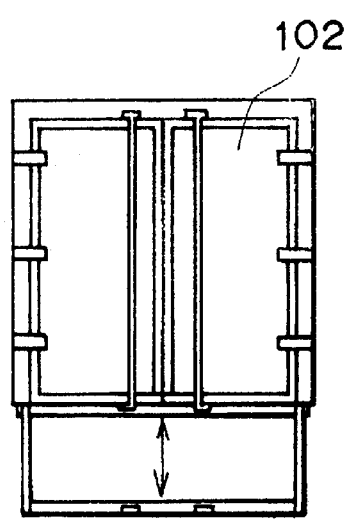
Prior Art
FIG. 13(a)
Prior Art
FIG. 13(b)
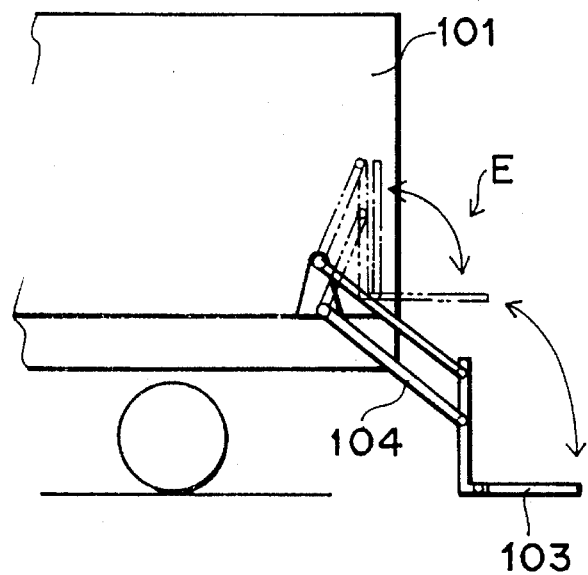
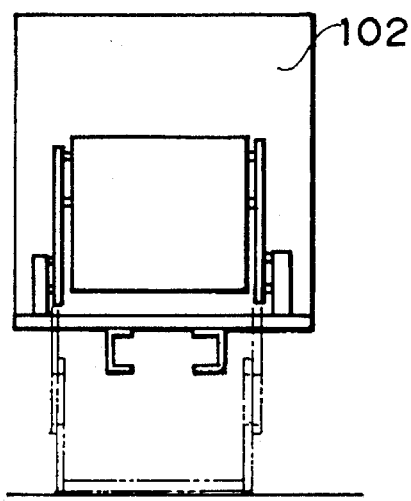

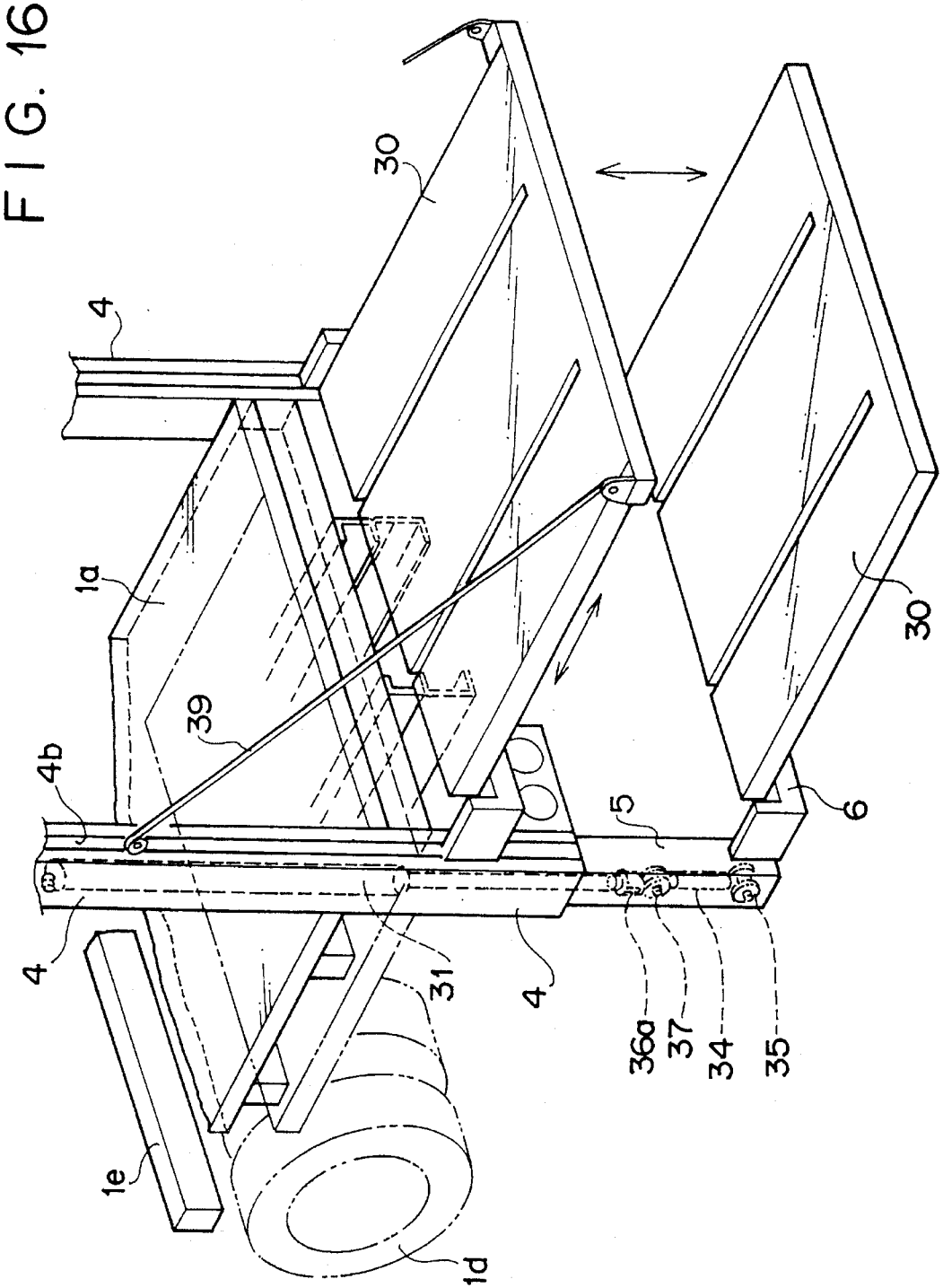

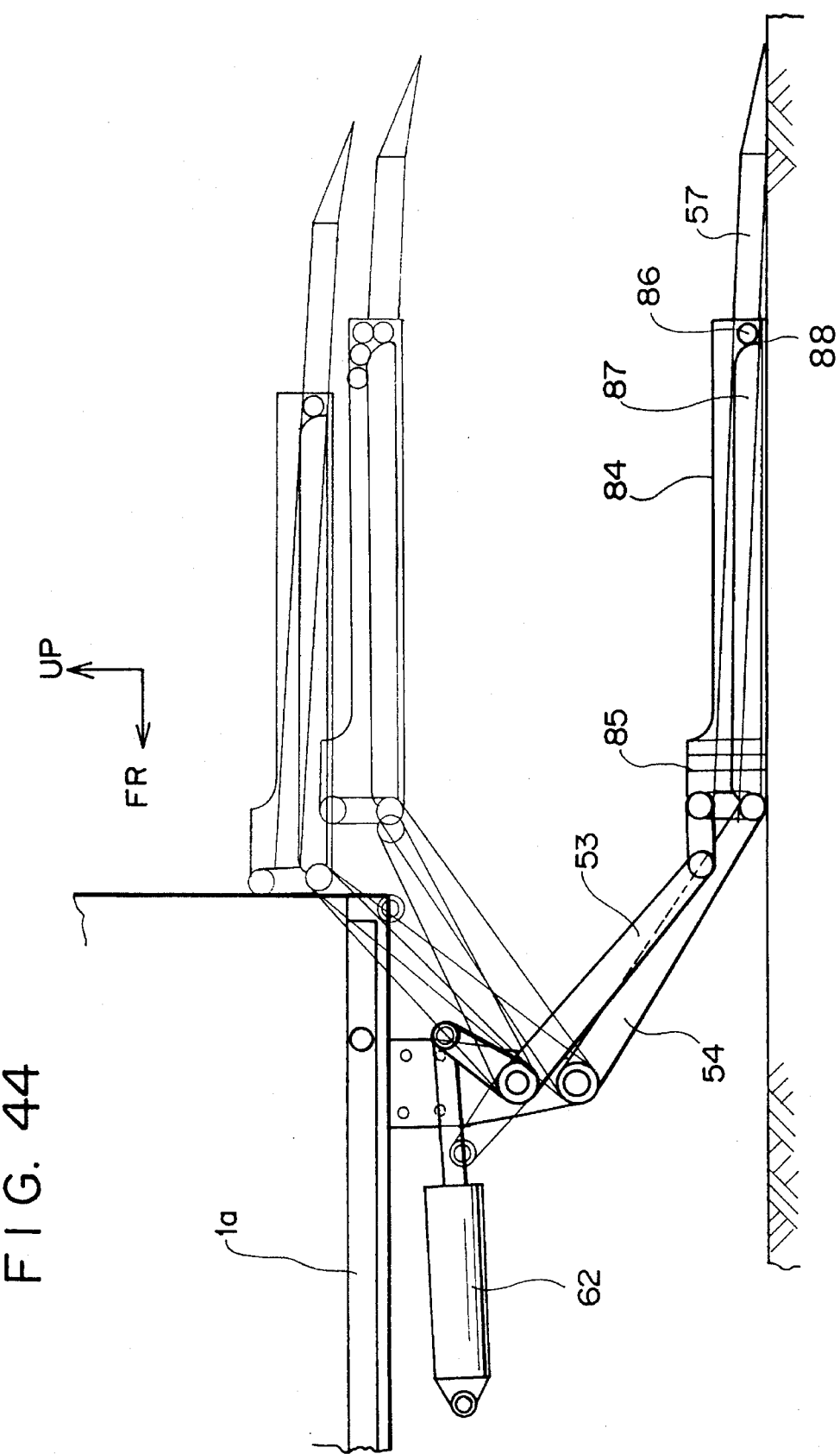

LIFT FOR LOADING AND UNLOADING A TRUCK

BACKGROUND OF THE INVENTION

This invention relates to a lift for loading and unloading a truck, and more particularly to a lift mounted on a freight collection/delivery truck at a rear end of a load-carrying platform.

Recently, distributors in Japan have established a distribution system in which furnitures and other properties to be moved at the time of house-moving are transported by being accommodated in special boxes or crates having castor wheels on their bottom sides and having dimensions of about 1,100 mm in width and length and 1,900 mm in height, and have developed such a system into a whole-country distribution network in Japan. The same distributors also have established and used a whole-country network of a separate small-lot delivery system.

However, vehicles for separate small-lot delivery must be so short in overall length as to be able to enter into a narrow passage, since they are used to deliver small packages to individual homes.

On the other hand, vehicles specially used for house-moving require a large lift (table lifter) for loading or unloading the above-mentioned special boxes and therefore have a large overall length.

It has been impossible to provide a large lift for small vehicles for separate small-lot delivery, because the performance for such a purpose is thereby impaired.

House-moving vehicles having large lifts are inconvenient when used for small-lot delivery because the operation interferes with the lift. Thus, small packages are loaded or unloaded through a rear door opening without using the rear end lift. Also, house-moving vehicles are inferior in quick-wheeling performance and their use is undesirable under present traffic circumstances, i.e., a serious traffic jam and strict parking restrictions, since a speedy collection/delivery operation is required for separate small-lot delivery.

That is, a load lift is used to move a heavy thing between the ground and a load-carrying platform, and is indispensable for house-moving vehicles frequently used to transport heavy things, but it is not necessary for vehicles for separate small-lot delivery.

For these different types of vehicles, however, different garages and drivers are required, and one distributor separately uses different vehicles in the same area, so that the traffic is aggravated.

Load lifts for use with the above-mentioned house-moving vehicles include types A to G shown in FIGS. 9(a) to 15(b). These types of lifts will be described below by using the same reference characters with respect to the same functional components.

In the case of the types A, B, and E (FIGS. 9(a), 9(b), FIGS. 10(a), 10(b), FIGS. 13(a), 13(b)), a lift table 103 is moved in a vertical direction by a parallel link 104 or a lift column 105, and is swung upward to be set in an upright position at the rear or in front of rear doors 102 of a load chamber or rear body or cargo space 101 when the lift is retracted. This lift has a drawback such that things cannot be loaded in or unloaded from the load chamber 101 unless the lift table 103 is operated to be set in a horizontal position.

In the case of the type C (FIGS. 11(a) and 11(b)), a lift table 103 is retracted by a parallel link 104 (not shown) to a position under the deck when the vehicle travels. Therefore, if a length L of the lift table 103 is increased, a dimension ROH (rear overhung) between rear tires 106 and a rearmost end of the rear body and, hence, the overall length of the vehicle is increased.

The same can also be said with respect to the type D (FIGS. 12(a) and (b)) having a deck corresponding to the ROH.

In the case of the type F (FIGS. 14(a) and 14(b)), a lift table 103 is retracted by being folded under the deck when the vehicle travels. Therefore, the retracting operation is complicated. In particular, if the lift table 103 is large and heavy, it is difficult to handle and the retracting operation is dangerous. Also, the ROH cannot be reduced as desired because of the existence of a parallel link 104.

The type G (FIGS. 15(a) and 15(b)) is a variation of the type A and has a lift table 103 which is retracted by being swung downwardly to be set in a vertical position below rear doors 102. If the size of the lift table 103 is increased, the ground clearance H of the end of the lift table 103 at the time of traveling becomes insufficient. The size of the lift table 103 is therefore limited.

SUMMARY OF THE INVENTION

An object of the present invention is to provide a lift for loading and unloading a truck which has a large lift table capable of loading or unloading a large and heavy thing but can be mounted on a small rear body having a small ROH, which enables things to be loaded in or unloaded from a load chamber only by opening rear doors without a lifting operation, and which is easy to operate.

To achieve this object, according to the present invention, there is provided a lift comprising lifting inner posts provided in left and right gateposts of a load chamber on the outside of rear doors thereof, the lift inner posts being capable of moving upward or downward, drive means for driving the lifting inner posts in a vertical direction, a lift support member connecting lower ends of the lifting inner posts and provided at a position slightly shifted rearward from an end surface of a floor of the load chamber, and a lift table having an opening formed in a portion corresponding to a chassis frame or a longitudinal joist, the lift table being capable of sliding on the lift support member in a longitudinal direction of the load chamber.

The lift table may be arranged to have pairs of inner and outer panels formed by laterally dividing its floor portion into four parts except for side and rear frame members, and is arranged to be retracted under the floor of the load chamber by upwardly swinging the pair of inner panels and superposing the inner panels on the pair of outer panels fixed to the side and rear frame members, or by upwardly swinging the pair of outer panels and superposing the outer panels on the inner panels fixed to the side and rear frame members.

The lift may comprise a hanging device for hanging a rear portion of the lift table on the lift inner poles.

The hanging device may be of an extension type.

The hanging device may be a wire rope connecting an extreme end of the drive means and a rear portion of the lift table.

The lift may also comprise play means for providing a certain play at an extreme end of the drive means in a direction along a vertical stroke of the lifting inner posts to enable the lift table to swing.

Further, the lift may comprise slack absorbing means for absorbing a slack of the wire rope by tensioning the wire rope by a certain stroke when the lift table is retracted.

According to the present invention, lifting inner posts are provided in the gateposts on the outside of the rear doors, and an opening is formed in the lift table to enable the lift table to be retracted while avoiding a chassis frame of a longitudinal joist under the deck of the vehicle. Therefore, the lift of the present invention can be mounted on conventional vehicles without any remodeling.

A device for hanging a rear end portion of the lift table from the lifting inner posts is provided, whereby the bending strength of the lift table can be increased while the size of the lift table is increased.

A wire rope connecting an end of the drive means and a rear portion of the lift table is used as a hanging device, and the play means enables the end of the drive means to operate with a certain play in the direction of a vertical stroke of the lift inner poles. Therefore, the lift table can be swung to reduce the difference in level from the ground.

Further, the slack absorbing means absorbs a slack of the wire rope by tensioning the wire rope when the lift table is retracted. The wire rope is thereby prevented from being excessively slacked when the lift table is slid.

A lift for loading and unloading a truck according to the present invention comprises support posts mounted at both sides of a rear end of a rear body; support members provided to the chassis frame; at least a pair of first and second arm members forming a parallel link mechanism, one ends of the arm members being connected with the support posts, and other ends thereof being connected with the support members with determined distance between shafts; drive means for driving the support posts or the first and second arm members; a connect member which connects lower ends of the support posts; and a lift table having a slit or an opening formed in a portion corresponding to a chassis frame or a longitudinal joist, the lift table being capable of sliding on the lift support member in a longitudinal direction of the connect member.

Thus, the distance between the shafts of the support members is made shorter than that between the support posts, so that the support posts when raised approximately a vertical posture, and that when lowered tilt in the rear direction.

Further, a sleeve is rotatably provided to the connect member, the sleeve contacting the lift table while rolling.

A hanging member is provided to hang from the support post rear end of the lift table. The hanging member is adjustable in length.

The lift according to the present invention includes support posts mounted at both sides of a rear end of a rear body; a connect member extending in a longitudinal direction and connecting lower ends of the support posts; a lift for moving upward and downward the support posts; and a lift table having a slit or an opening formed in a portion corresponding to a chassis frame or a longitudinal joist, the lift table being capable of sliding on the lift support member in a of the connect member; arms provided at both sides of the connect member as to protrude rearwardly, the arms supporting the lift table.

Arms are provided rotatably at both sides of the connect member. The arms are parallel with the connect member at the time of contracting the lift table and almost at a right angle with respect to the connect member when the table is drawn out.

The arms have a U-shape cross section which hold the sides of the lift table.

Further, balls or rollers are provided at the rear end of the lift table, while guides are provided within the arms and engaging holes at the ends of the guides so that the balls or rolls are engaged with the engaging holes to lock the lift table when the lift table is drawn out to its maximum extent.

BRIEF DESCRIPTION OF THE DRAWINGS

FIG. 8 is a perspective view of an essential portion of a second embodiment of a load lift in accordance with the present invention;

FIGS. 12(a) and 12(b) are views of a further example (type D) of a conventional load lift;

FIGS. 13 (a) and 13 (b) are views of a further example (type E) of a conventional load lift;

FIG. 16 is a perspective view of a third embodiment of a load lift in accordance with the present invention;

FIG. 32 is a perspective view thereof, FIG. 33 is a side view and FIG. 34 is a rear view thereof.

FIG. 35 is a rear view, FIG. 36 is a plan view, FIG. 37(A) a side view and FIG. 37(B) a partly enlarged plan view.

FIG. 40 is a plan view, FIG. 41 a rear view and FIG. 42 a side view of the lift of the eleventh embodiment.

FIG. 44 is a portion of a thirteenth embodiment of the lift according to the present invention.

DESCRIPTION OF THE PREFERRED EMBODIMENTS

The present invention will be described below in more detail with respect to embodiments thereof.

Figure 1:
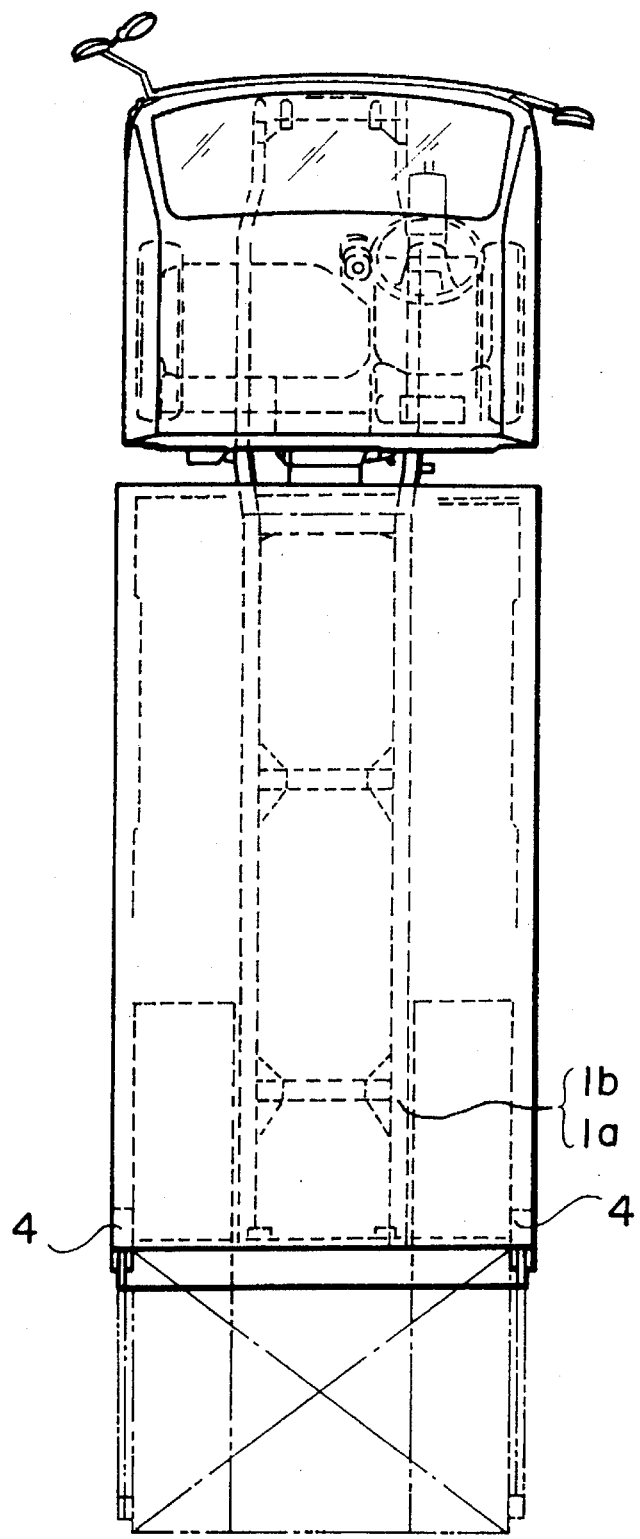
FIG. 1 is a plan view of a first embodiment of a load lift in accordance with the present invention.
Figure 2:
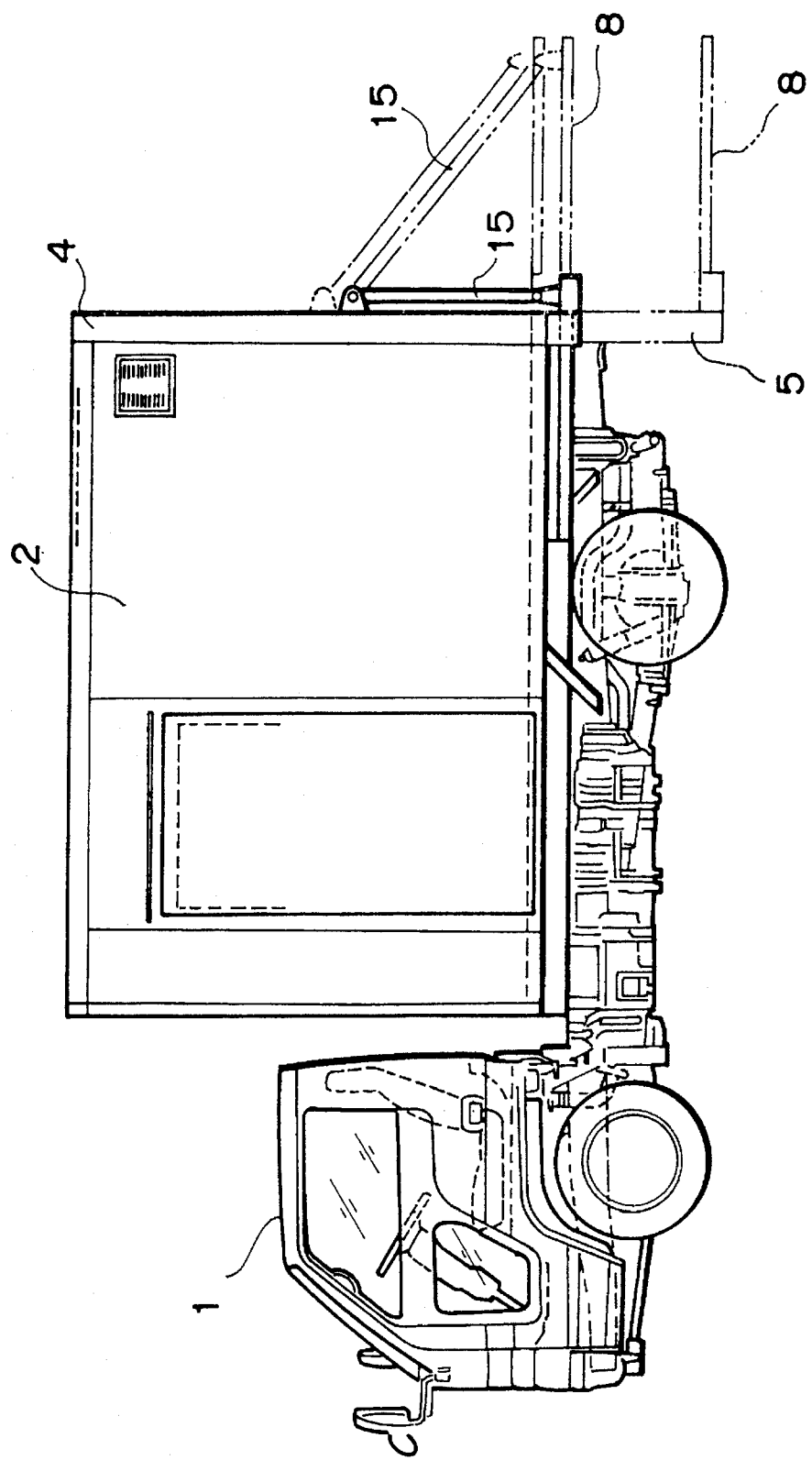
FIG. 2 is a side view of the load lift in accordance with the first embodiment.
Figure 3:
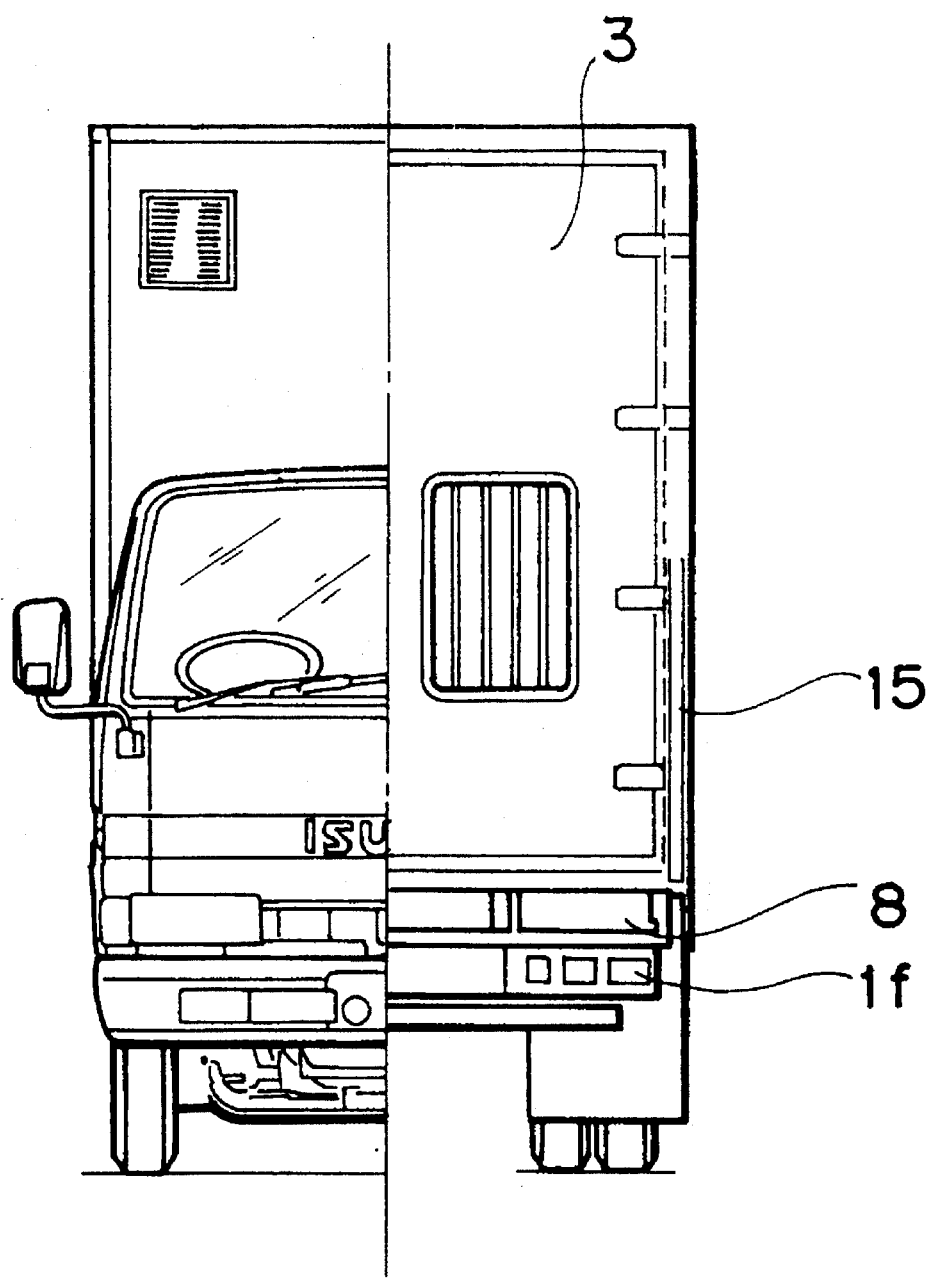
FIG. 3 is a front/rear view of the load lift of the first embodiment.
Figure 4:
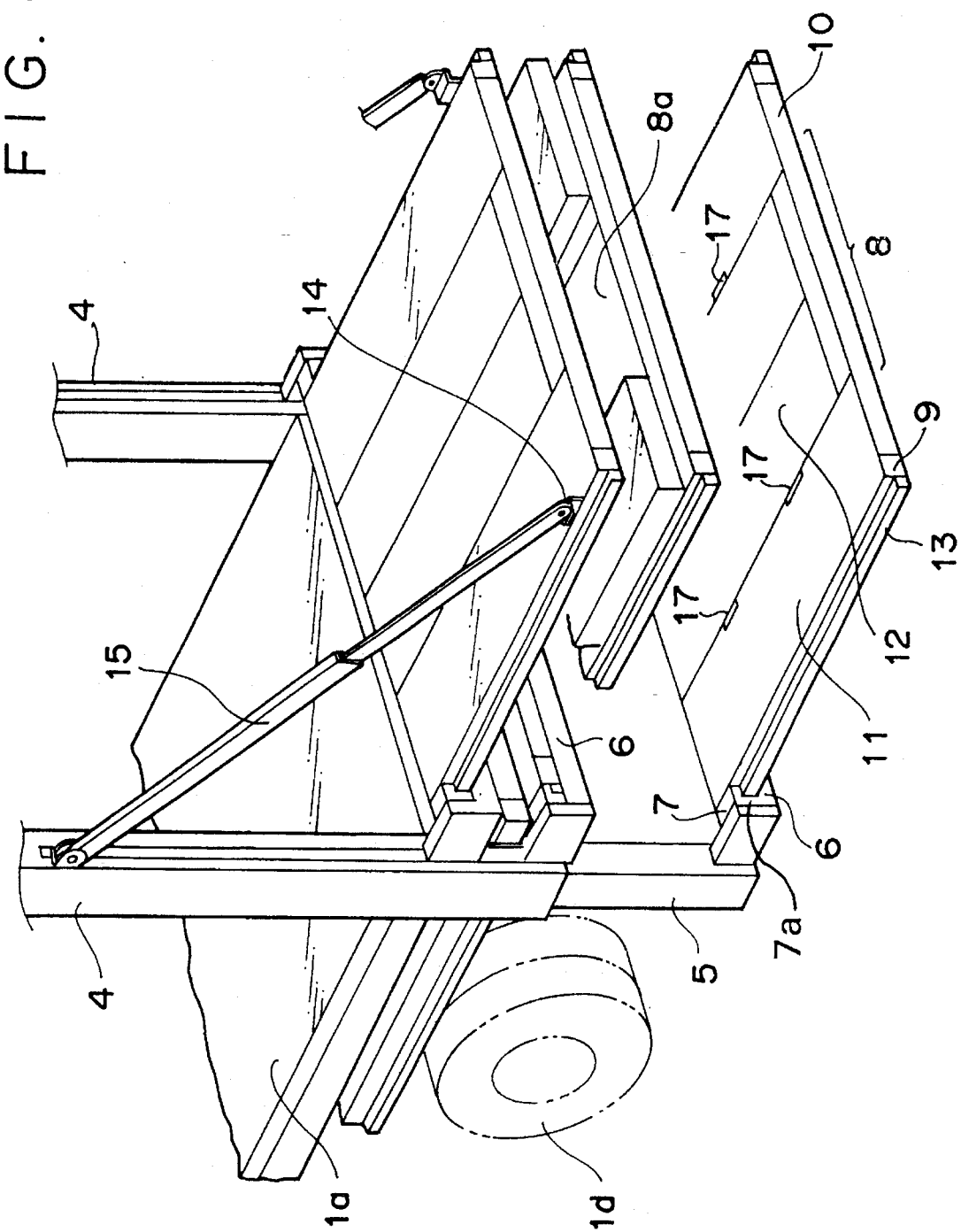
FIG. 4 is a perspective view of an essential portion of the load lift of the first embodiment.
Figure 5:
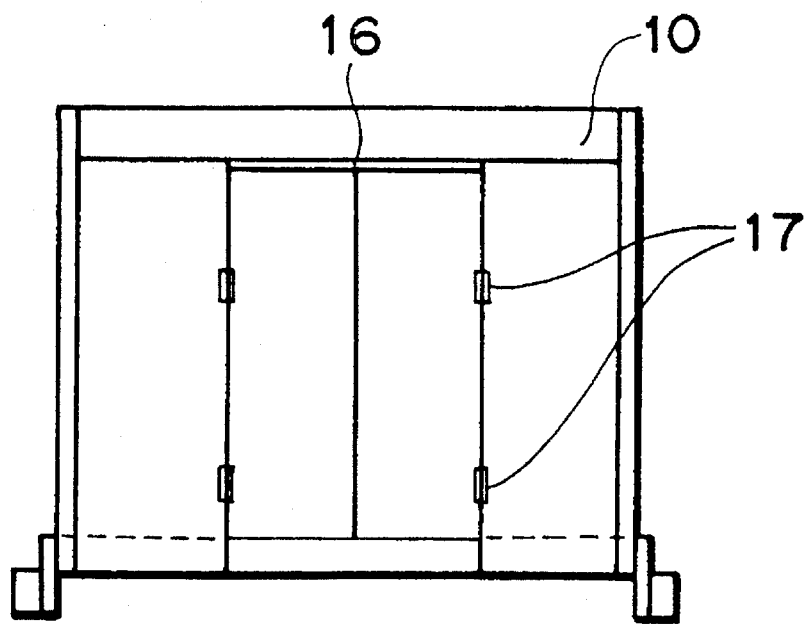
FIGS. 5 to 7 are views for explaining the operation of the load lift of the first embodiment.
Figure 6:
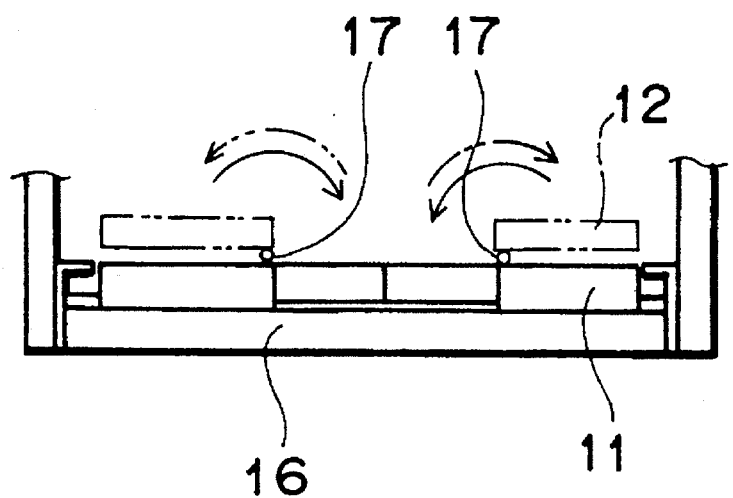
Figure 7:
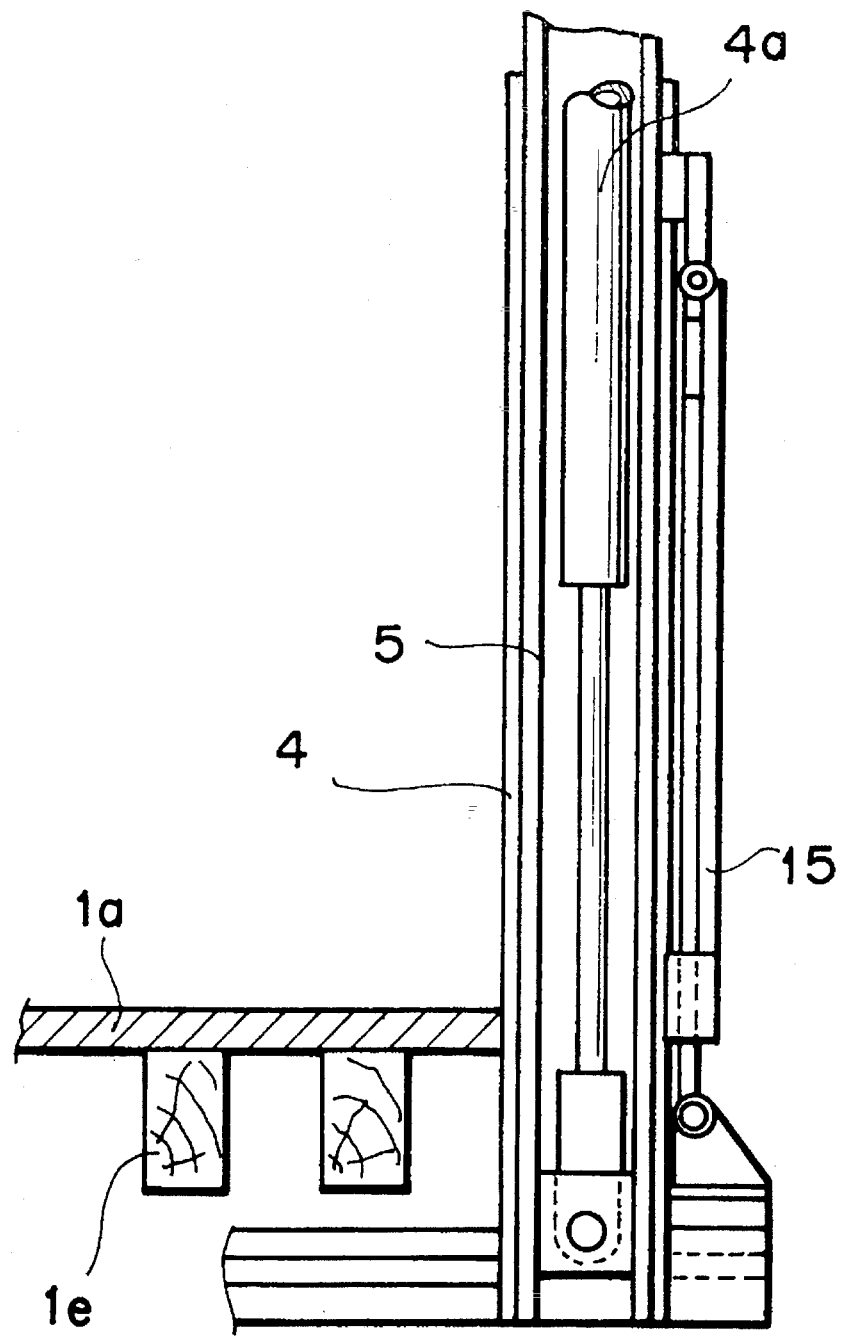
Figure 9A:
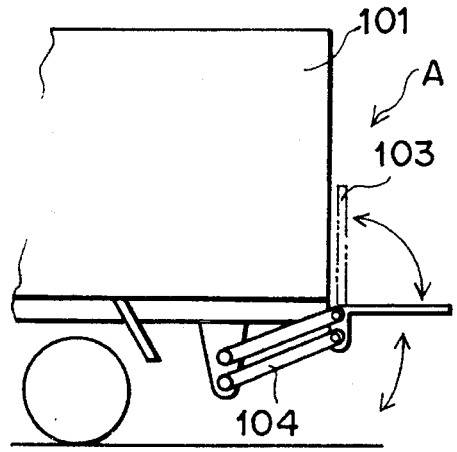
FIGS. 9(a) and 9(b) are views of an example (type A) of a conventional load lift.
Figure 9B:
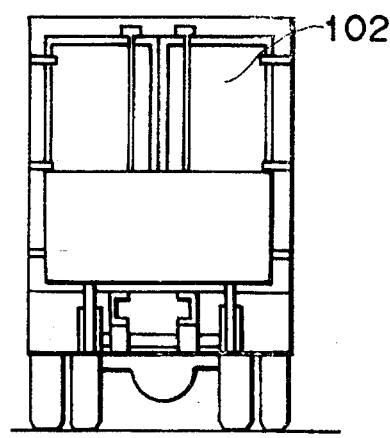
Figure 10A:
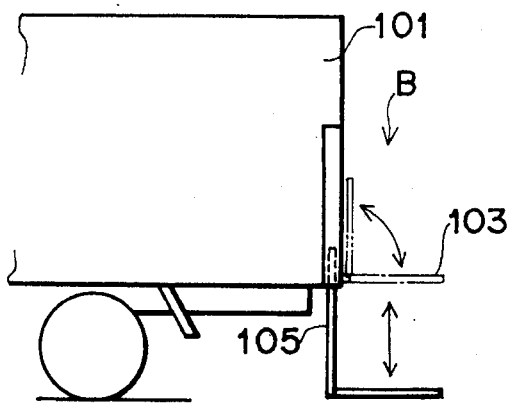
FIGS. 10(a) and 10(b) are views of another example (type B) of a conventional load lift.
Figure 10B:
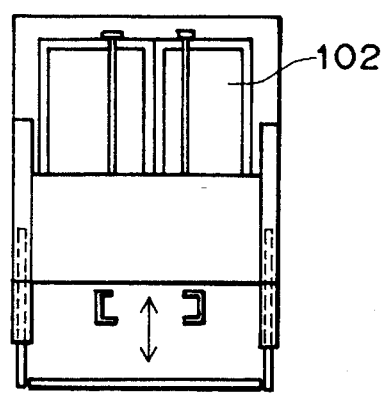
Figure 11A:
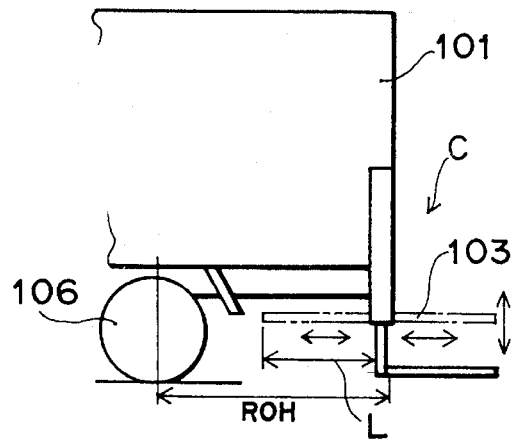
FIGS. 11 (a) and 11 (b) are views of a further example (type C) of a conventional load lift.
Figure 11B:
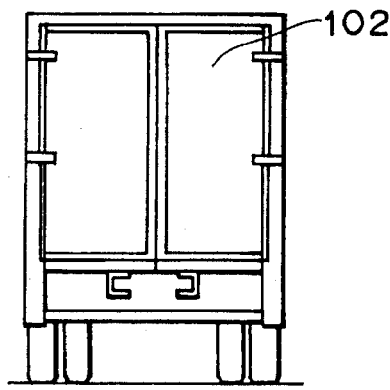
Figure 14A:
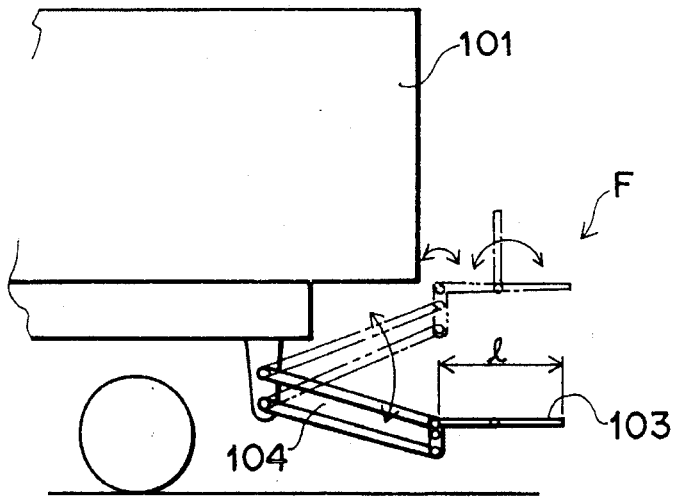
FIGS. 14(a) and 14(b) are views of a further example (type F) of a conventional load lift.
Figure 14B:
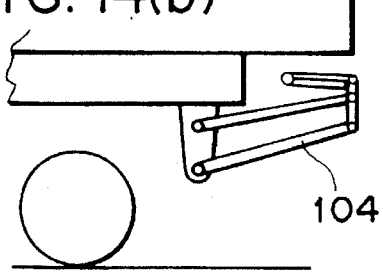
Figure 15A:
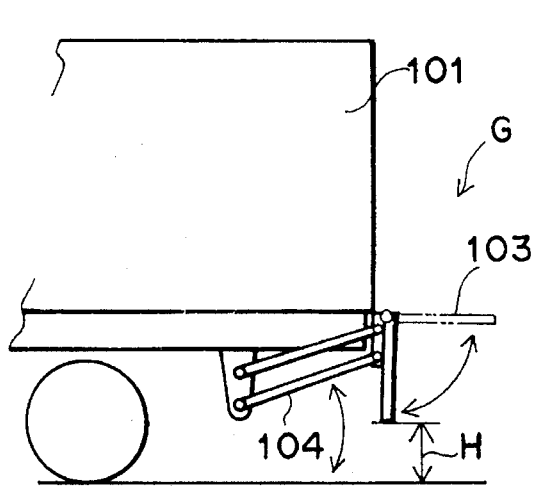
FIGS. 15(a) and 15(b) are views of a further example (type G) of a conventional load lift.
Figure 15B:
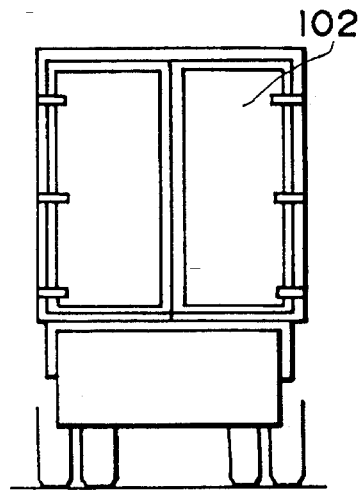

FIGS. 1 to 7 show a load lift in accordance with the first embodiment of the present invention. FIG. 1 is a plan view; FIG. 2 is a side view; FIG. 3 is a front/rear view; FIG. 4 is a perspective view of a main portion; and FIGS. 5 to 7 illustrate the operation of the load lift.

A vehicle 1 shown in FIGS. 1 to 3 is of three tons or so in weight and is to be used for small-lot delivery system, and its dimensions are preferably, for example, of about 4925 mm in overall length, 1730 mm in width and 3110 mm in height. The vehicle 1 has rear doors 3 which are provided in the rear side of a rear body 2, and gateposts 4 are disposed at right and left sides of a frame to which the rear doors 3 are attached (FIG. 1).

As shown in FIG. 4, lifting inner support posts 5 are inserted in the gateposts 4 and project downward from the same, and lower end portions of the lifting inner posts 5 are connected by a lifting crossbeam or connection member 6 which is disposed in a position slightly shifted rearwardly relative to the rear end of the rear body 2.

The lifting inner posts 5 are suspended by traction devices 4a ( FIG. 7 ) provided in the gateposts 4. A hydraulic cylinder, wire rope or the like is used as each traction device 4a to perform lifting by power from a battery power source or the vehicle engine.

Slide guides 7 are provided on left and right ends of the upper surface of the lifting crossbeam 6. Each slide guide 7 has a channel 7a having a U-shaped rectangular cross section. A lift table 8 is slidably inserted in the U-shaped channels 7a of the slide guides 7.

The lift table 8 has a pair of side frame members 9 and one rear frame member 10 combined to form a U-shaped rectangular frame opened at a front side. A pair of outer panels 11 are fixed in the frame with a central spacing left between them. A pair of inner panels 12 are set between the outer panels 11 so as to close the spacing.

The inner panels 12 are mounted so as to be openable by swinging on hinges 17, and can be swung from the center to the left and right to be superposed on the outer panels 11.

A fore end of the lift table 8 is mounted on the lifting crossbeam 6. A rail 13 is provided on an external side of each side frame member 9, and is inserted in the U-shaped channel 7a of the corresponding slide guide 7, so that the table 8 can be drawn out and retracted along a longitudinal direction of the vehicle.

Brackets 14 are provided on rear end portions of the lift table 8 and are connected to extendable hanging rods 15 by pins, thereby being hung from the lifting inner posts 5.

The extension of the hanging rods 15 is limited when the lift table 8 is drawn out to a maximum extent, whereby the rear end portions of the lift table 8 are supported.

When the lift table 8 is retracted by being moved toward the fore end of the vehicle, the length of the hanging rods 15 is minimized and the hanging rods stand upright along rear surfaces of the gateposts 4.

The operation of the load lift of the first embodiment will be described below.

To use this lift, the rear doors 3 of the vehicle 1 are first swung on hinges provided at outer corners of the gateposts 4 to be open by about 260°.

Next, a drawing-out lock (not shown) placed under the deck is disengaged and the lift table 8 is drawn to a position at the rear of the rear body 2.

When the lift table 8 is drawn out to the maximum extent, the fore end of the lift table 8 is on the lifting crossbeam 6 and is not protruding beyond the fore end surface of the lifting crossbeam 6. The lift table 8 is automatically locked in this state and is prevented from returning. (This locking is not illustrated.)

At this time, the hanging rods 15 are extended to the maximum extent to hang and support the rear end of the lift table 8 (FIG. 4).

Next, as shown in FIG. 6, the inner panels 12 on the outer panels 11 are raised and unfolded to close a space 8a (FIG. 4) between the outer panels 11. At this time, lower surfaces of the inner plates 12 are supported on the lifting crossbeam 6 and a support plate 16 provided on the rear frame member 10 and are thereby prevented from falling.

Further, a hydraulic valve (not shown) is operated to extend the traction devices 4a (hydraulic cylinders), thereby moving the lift table 8 downward.

Conversely, when this lift is retracted, the inner panels 12 of the lift table 8 are swung upward on the hinges 17 and are respectively superposed on the outer panels 11 to form the space 8a at the center of the lift table 8.

Subsequently, the lift table 8 is driven in the vertical direction and is stopped at a position slightly lower than longitudinal joists 1c extending along a lower surface of the deck of the rear body 2.

Next, the above-mentioned drawing-out lock is disengaged and the lift table 8 is retracted by being moved forward. The drawing-out lock operates when the lift table 8 is set in a position such as not to protrude beyond the rear end of the lifting crossbeam 6. The retraction of the lift is thereby completed.

The retracted lift table 8 has a space 8a at the center thereof and therefore it can be retracted easily without interfering with the chassis frame 1b and longitudinal joists 1c of the rear body 2.

The lift table 8 can be accommodated under the deck by being passed forward over tires 1d of the vehicle 1. The length of the lift table 8 can therefore be increased as desired. Even if the length of the lift table 8 is increased, the strength of the lift table 8 is sufficiently large in comparison with the cantilever support of other conventional types of lifts, since the fore end thereof is supported on the lifting crossbeam 6 and the rear end is supported by the hanging rods 15. Therefore, the weight of the lift table 8 can be reduced.

FIG. 8 is a perspective view of a second embodiment of the load lift in accordance with the present invention.

Components or portions having the same function as those of the above-described first embodiment are indicated by the same reference characters, and the description for them will not be repeated.

In the lift in accordance with the second embodiment, two slits 21 are formed in portions of a lift table 20 such as to avoid striking on chassis frame members 1b, and slit covers 22 are provided on the slits 21.

This lift is used in substantially the same manner as in the case of the first embodiment. However, the second embodiment differs from the first embodiment in that the slits 21 are opened or closed with the slit covers 22. In the second embodiment, the lift preparation operation is easier because the slit covers 22 are light. Also, since the slits 21 have a small width, the slit covers 22 can have a sufficient strength even if the thickness thereof is small, and, accordingly, the necessary height of the lift table when the lift table is retracted can be limited.

Figure 17:
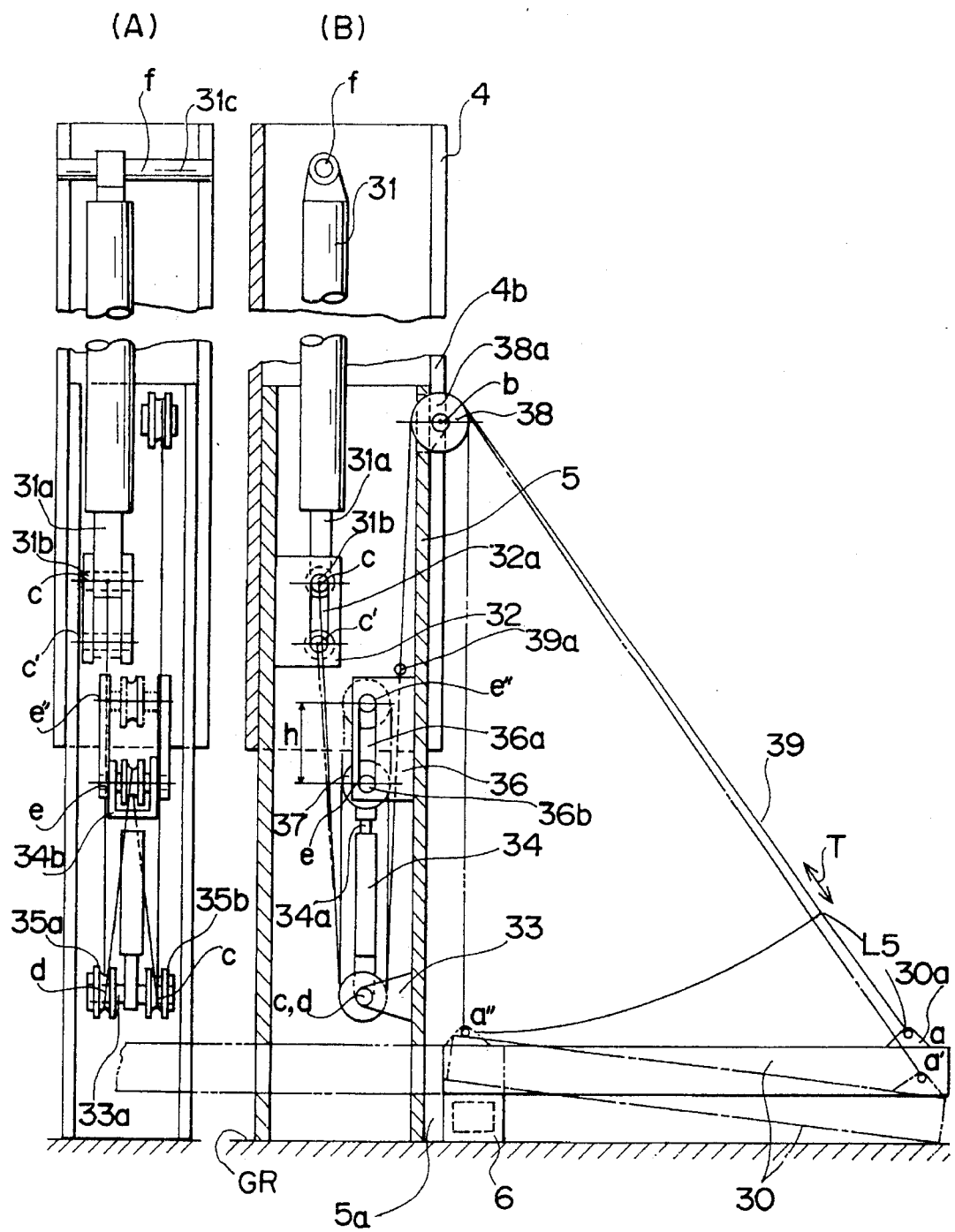
FIG. 17 is a cross-sectional view of an essential portion of the load lift in accordance with the third embodiment.

FIGS. 16 to 26 are views showing a load lift of the third embodiment of the present invention. FIG. 16 is a perspective view, FIG. 17 is a cross-sectional view of an essential portion, and FIGS. 18 to 26 are views for explaining the operation.

In the load lift of the third embodiment, a hydraulic cylinder 31 is used as a traction means and is mounted on a shaft 31c in each of gate poles 4. The hydraulic cylinder 31 has a rod 31a and a pin 31b provided at an extreme end of the rod 31a. The pin 31b is slidably inserted in an elongated hole 32a formed in a bracket 32 attached to a corresponding one of lift inner poles 5 (play means).

A bracket 33 is provided on a lower portion of each lift pole 5, and a shaft 33a is supported on the bracket 33. A head portion of a gas damper 34 and sheaves 35a and 35b are provided on the shaft 33a.

The gas damper 34 is a tensioner for tensioning a wire rope 39 described later. A generally U-shaped metallic member 34b is provided on an extreme end of a rod 34a of the gas damper 34. A bracket 36 is mounted on an internal surface portion of each lift inner pole 5, and a shaft 36b is slidably supported in elongated holes formed in the bracket 36. The generally U-shaped metallic member 34b of the gas damper 34 and a sheave 37 are provided on the shaft 36b (slack absorbing means).

A bracket 38a is attached to a portion of each lift inner pole 5 in the vicinity of the upper end thereof, and a sheave 38 is provided on a shaft supported on the bracket 38a.

One end of the wire rope 39 is connected to the extreme end of the rod 31a of the hydraulic cylinder 31 ((B) of FIG. 17). The wire rope 39 is successively wrapped around the sheaves 35a, 37, 35b, and 38. The other end of the wire rope 39 is connected to a corresponding one of brackets 30a attached to rear end portions of a lift table 30.

The operation of the third embodiment will be described below.
Lift table setting operation:

First, the rear doors 3 are swung to the left and right to be open by about 270° and are fixed by door locks 3a.

Figure 19:
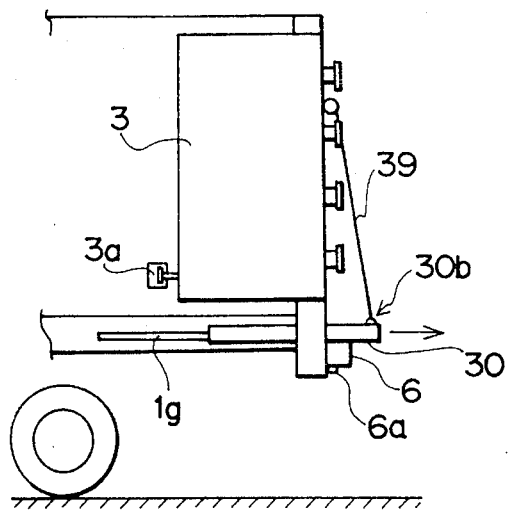

Next, a table lock 30b (whose mechanism not shown) is disengaged and the lift table 30 is drawn out (FIG. 19). As the lift table 30 is drawn rearward by hand, the gas dampers 34, i.e., the wire tensioners in the lifting inner posts 5 contract to tension the wire rope 39.

The lift table 30 is extended rearward along a slide guide means 1g on longitudinal joists 1c in parallel with a deck 1a. When the amount of rearward extension of the lift table 30 exceeds a half the length of the lift table 30, the weight of the lift table 30 acts to move the lift table 30 downward. At this time, a vertical component of the tension of the wire ropes 39 acts to lift the rear end of the lift table 30 and cancels the force of the weight, thereby enabling the lift table 30 to be drawn out easily.

When the lift table 30 is drawn out to the maximum extent, the table lock 30b operates to fix the lift table 30, with the fore end surfaces of the lifting crossbeam 6 and the lift table 30 becoming flush with each other.

At this time, the lift table 30 is disengaged from the slide guide means 1g on the longitudinal joists 1c, and the weight of the lift table 30 is supported by the lifting crossbeam 6 and the wire rope 39 so that the lift table 30 is maintained in parallel with the deck 1a.

Figure 20:
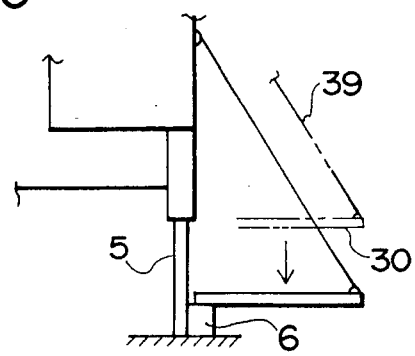

In this state, the moving sheaves 37 of each gas dampers 34 are at a position e such that the contraction of the gas damper 34 is maximum. The gas dampers 34 do not contract any more. During this operation, the shaft 31b constituting the play means and provided on the extreme end of each hydraulic cylinder 31 is at an upper limit position c.
Lift table lowering operation Next, as the hydraulic cylinders 31 are extended, the lifting crossbeam 6 and the lift table 30 are moved downward together with the lift inner poles 5 (FIG. 20).

Figure 21:
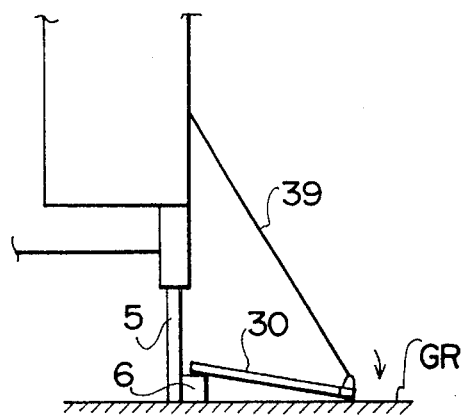
Figure 22:
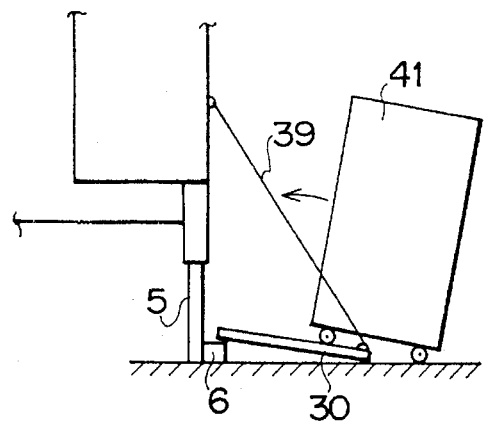

After the lower surface of the lifting crossbeam 6 has reached the ground GR, the hydraulic cylinders 31 are further extended. The shafts 31b are thereby moved downward in the elongated holes 32a constituting a play mechanism, and the wire ropes 39 are slackened correspondingly. The rear end of the lift table 30 is thereby moved downward to contact the ground so that the upper surface of the lift table 30 are sloped toward the rear end (FIG. 21). In this state, the shafts 31b constituting the play means are at a play lower limit c'.

If the ends of the hydraulic cylinders 31 are further moved downward, the wire ropes 39 are slackened. However, the gas dampers 34 constituting a slack absorption means are extended to absorb slacks of the wire ropes 39 so that the desired tension of the wire rope 39 is maintained, thereby preventing the wire rope 39 from coming off or being entangled.
Loading operation A load box 41 with castor wheels is moved onto the lift table 30 by being pushed from the rear side thereof (FIG. 22), and is fixed on the lift table 30 by operating stoppers (not shown) of the castor wheels.

Figure 18:
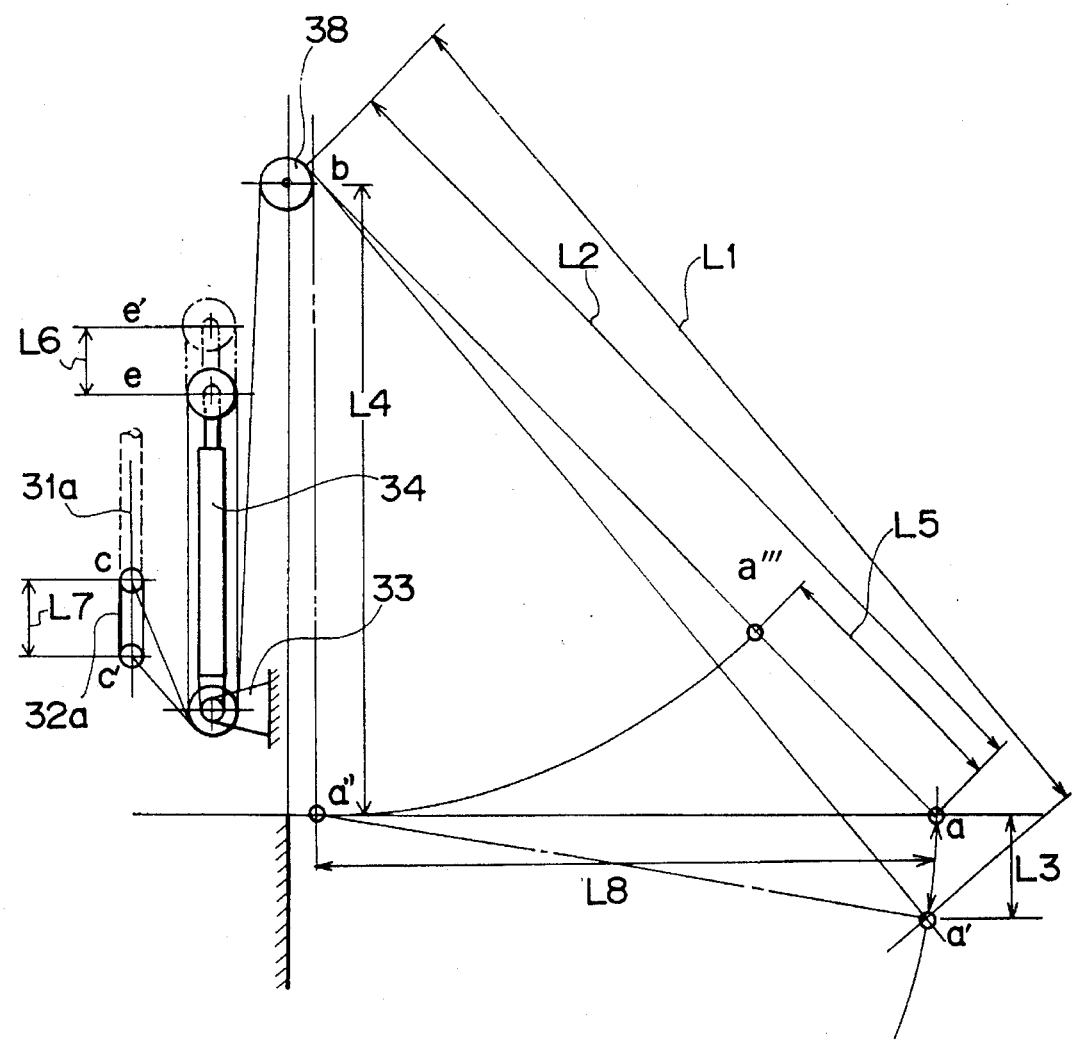
FIGS. 18 to 26 are views for explaining the operation of the load lift in accordance with the third embodiment.
Figure 23:
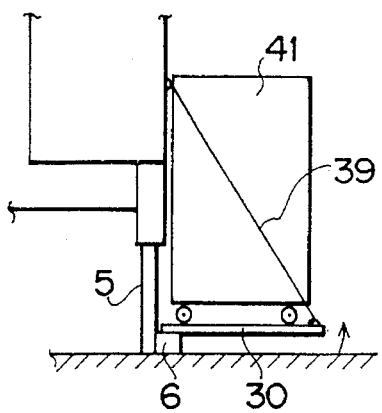

Then, the hydraulic cylinders 31 are contracted until the gas dampers 34 are contracted to the maximum contraction position e as shown in FIG. 18. As the hydraulic cylinders 31 are further contracted, the pins 31b at the extreme ends of the rods 31a of the hydraulic cylinders 31 are moved upward in the elongated holes 32a of the brackets 32 to the upper limit c. At this time, the rear end of the lift table is pulled upward so that the lift table 30 becomes parallel to the upper surface of the deck 1c (FIG. 23).

Figure 24:
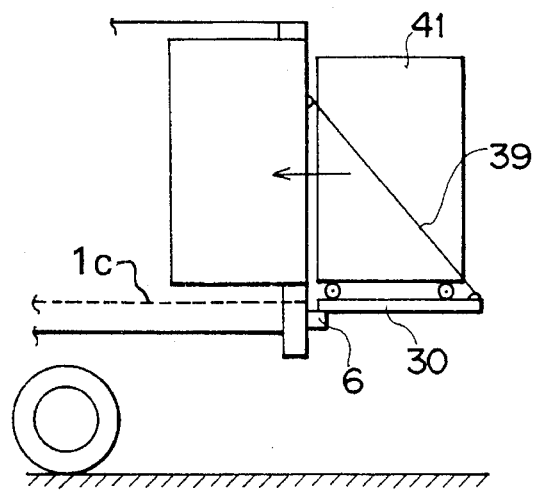
Figure 25:
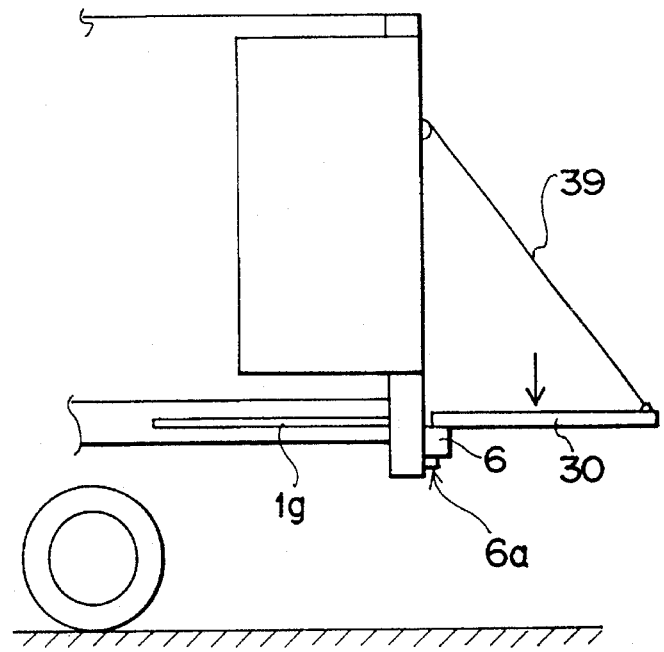
Figure 26:
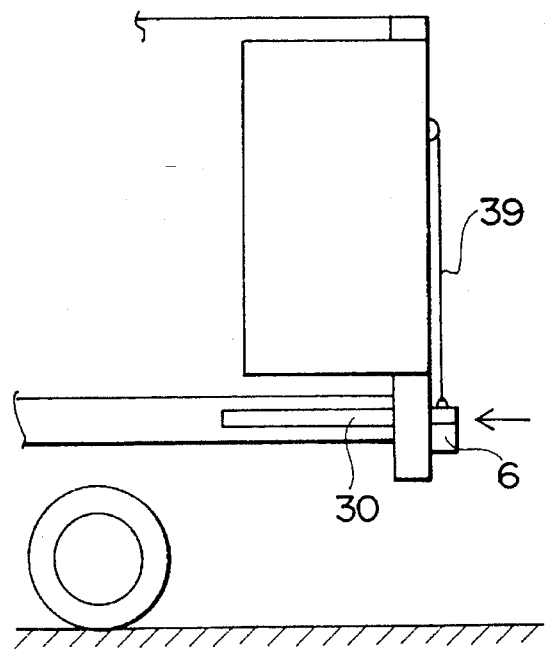

As the hydraulic cylinders 31 are further contracted, the lifting inner posts 5, the lifting crossbeam 6 and the lift table 30 are simultaneously moved upward. This movement is stopped when the upper surface of the deck 1c and the upper surface of the lift table 30 become flush with each other. The movement may be automatically stopped at this time by using a stopper, a limit switch or the like (FIG. 24).

The castor stoppers of the box 41 with the caster wheels are released and the box 41 is thereafter moved into the load chamber by being pushed.
Lift table retraction operation The hydraulic cylinders 31 are extended to move the lift table 30 downward. The lift table 30 is stopped when the height of the slide guide means 1g provided on the longitudinal joists 1e and the height of the lift table 30 become equal to each other. It may be automatically stopped by using a positioning stopper, a limit switch or the like.

Thereafter, the lock of the lift table 30 is released and the lift table 30 is moved forward by being pushed.

The lift table 30 moves forward with the longitudinal joists 1e entering the slits in the lift table 30. The lock 6a is engaged when the lift table 30 is moved to a position such that the rear surface of the lift table 30 becomes substantially flush with the rear surface of the lifting crossbeam 6. During this operation, slacks of the wire ropes 39 are absorbed by the gas dampers 34 so that constant tensions of the wire ropes 39 are maintained. The rear end of the lift table 30 is thereby moved forward while being pulled upward, thereby being retracted smoothly along the slide guide means 1g.

The unloading operation is performed by a procedure reverse to that described above.

Manufacturing Example

A manufacturing example will be described below with reference to FIG. 18. A swinging range L3 of the lift table 30 and the amount of slackening of the wire ropes 39 with the drawing-out/retraction of the lift table 30 are as shown below.

$$a \sim a' \approx \text{(nearly equals)} \ ba' - ba = L1 - L2 = L3 = 1880 - 1740 = 140 \text{[mm]}$$

$$a \sim a''' \approx \text{(nearly equals)} \ ba - ba'' = L2 - L4 = L5 = 1740 - 1240 = 500 \text{[mm]}$$

If the wire ropes 39 are three-fold wrapped as in the third embodiment, a gas damper 34 stroke e~e':

$$e \sim e' = L6 = 500/3 \neq \text{(nearly equals)} \ 170 \ \text{[mm]}$$

will suffice. If a gas damper having a stroke of 627–348=243 is used as gas damper 34, the stroke is greater than 170 [mm]. A gas damper of this specification has a reaction force of 44 to 67 kg (max~min), 50 to 61 kg (operating range), and the corresponding tension of the wire ropes 39 is $$61/3 \neq \text{(near equals)} \ 20 \ \text{(kg/ropes)}.$$

Fourth Embodiment

Figure 27:
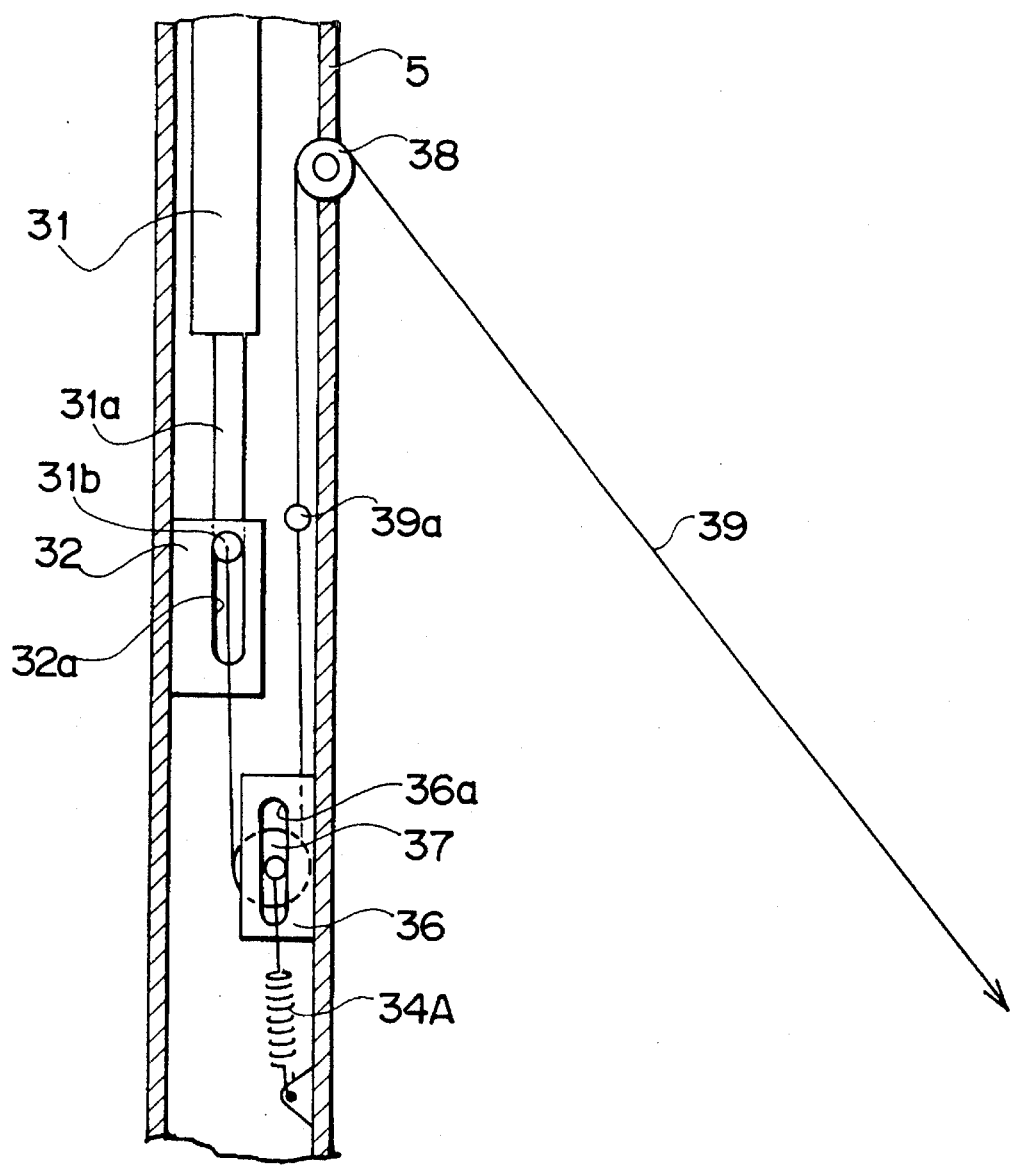
FIG. 27 is a cross-sectional view of an essential portion of a load lift in accordance with a fourth embodiment of the present invention.

FIG. 27 shows a load lift in accordance with the fourth embodiment of the present invention.

In this embodiment, a spring 34A and a moving sheave 37 constitute a slack absorption means. In this case, wire rope 39 attached to an extreme end of a hydraulic cylinder 31 is connected to a rear end portion of a lift table (not shown) via the moving sheave 37 and a sheave 38.

This embodiment uses a simple structure in which the moving sheave 37 is only tensioned along an elongated hole 36a, so that the manufacturing cost can be reduced.

Example of use of lift table as a gangboard

Figure 28:
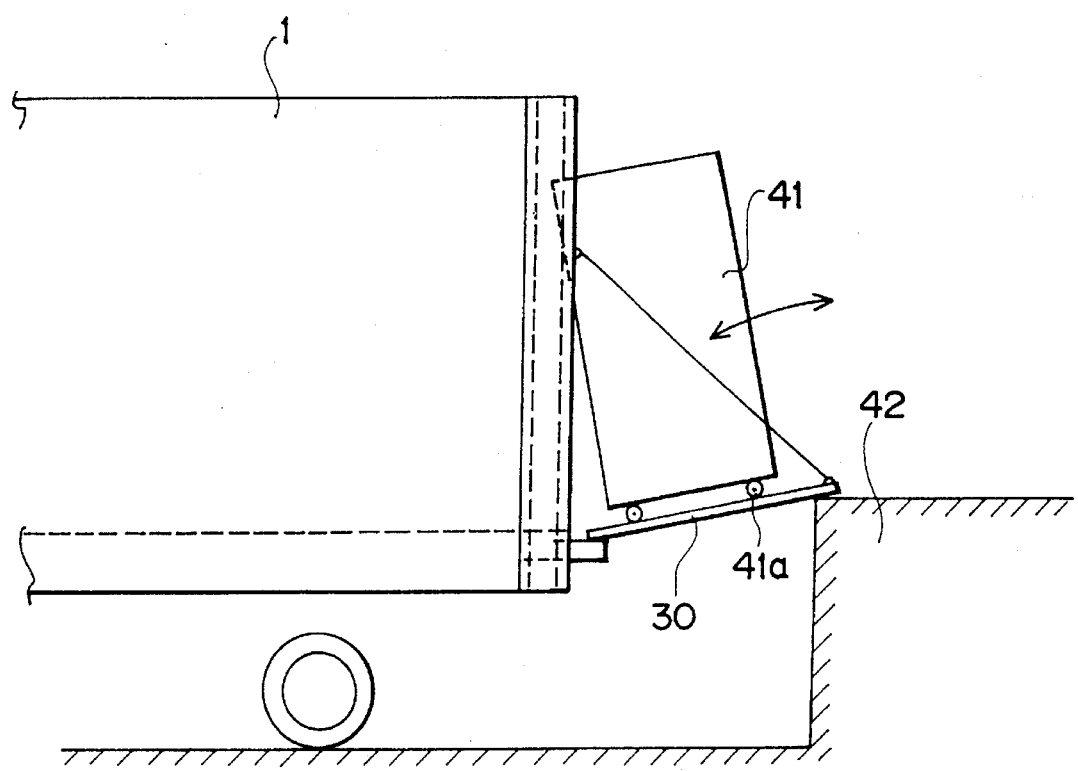
FIG. 28 is a view of another example of the use of the load lift in accordance with the present invention.

FIG. 28 shows another example of use of the load lift in accordance with the present invention.

A motor vehicle 1 is a small vehicle having a lift in accordance with the third or fourth embodiment of the present invention. In a case where there is a difference in level between the upper surface of a deck 1a of the vehicle 1 and a platform 42 (or a deck of another vehicle) having a height from the ground higher than that of the upper surface of the deck 1a, it may be impossible to move castor wheels 41a of a box 41 over the difference in level.

In such a case, the lift table 30 can be used as a gangboard in such a manner that the lift table 30 is drawn out and the rear end thereof is lifted and placed on the platform 42, thereby enabling the castor wheels 41a to be easily moved over the difference in level onto the platform 42.

If the wire ropes 39 are slacked to such a large extent such that the slack cannot be suitably absorbed by the slack absorbing means ( gas dampers 34, springs 34A and other members ), it is possible that the tension of the wire ropes 39 are reduced so that the wire ropes 39 are further slacked to come off the predetermined wire route or to be entangled in the posts 4.

To prevent such a result, a wire stopper 39a may be provided which is capable of contacting each bracket 36 to prevent the wire rope 39 from being drawn in excessively so that the length of wire rope 39 retracted is larger than that defined in a state where the slack absorbing means is at the maximum stroke position e" and at the uppermost position c of the play means provided on the extreme end of the traction means (hydraulic cylinder 31) (FIGS. 17, 27).

In a case where the platform 42 is lower, the lift table 30 is stopped at a position where it is flush with the surface of the deck 1a, and the lifting crossbeam 6 or the lifting inner posts 5 are mechanically fixed on the gateposts 4 by a pin or hinge type stopper. Thereafter, the hydraulic cylinders 31 are extended to move down the rear end of the lift table 30 onto the platform 42, thereby enabling the lift table 30 to be used as a gangboard sloped toward the rear end.

The load lift in accordance with the third or fourth embodiment of the present invention has the following and other advantages in contrast with the conventional lifts.

With respect to operability, (i) small packages can be loaded or unloaded easily, because the rear doors can be opened/closed while the lift table is in the retracted state; (ii) loading/unloading of separate small-lot packages and mounting/demounting of an operator can be easily performed, because there are no cumbersome facilities under the deck and the deck height from the ground is low (e.g., about 850 mm); (iii) the retracting operation and structure are simple and the probability of malfunctions or accidents is low, because the lift is of a sliding type; (iv) the difference in level from the ground can be suitably reduced so that a box with castor wheels can be easily moved onto or off the lift table, because the lift table is of a swingable type; (v) a rear step can be provided; and (vi) a package or a box with castor wheels can be directly moved to or from a platform or another vehicle by using the lift table as a gangboard.

With respect to safety, (i) the load stability can be improved because the lift is of a vertically lifting type; (ii) packages or the operator can be prevented from falling from each side of the lift, because the wire ropes serve as side guards; (iii) there is no risk of interference with ground because there are no cumbersome facilities under the deck and the deck height from the ground is low; (iv) there is substantially no possibility of the wire ropes being excessively slacked or coming off, because they are automatically wound; and (v) the lift table is engaged with the guide rails and does not move downward so long as it is not drawn out.

In other respects, (i) the lift is light but has a large load capacity; (ii) the lift has a small size and a good appearance; (iii) a member for covering a bottom side of the lift can be provided so that the bottom is not freezed; (iv) the lifting power is large (rating/ton); (v) mechanical parts are incorporated in the gateposts to achieve a maintenance-free effect; and (vi) the lift table may be formed of stainless steel to be rustproof.

Figure 29A:
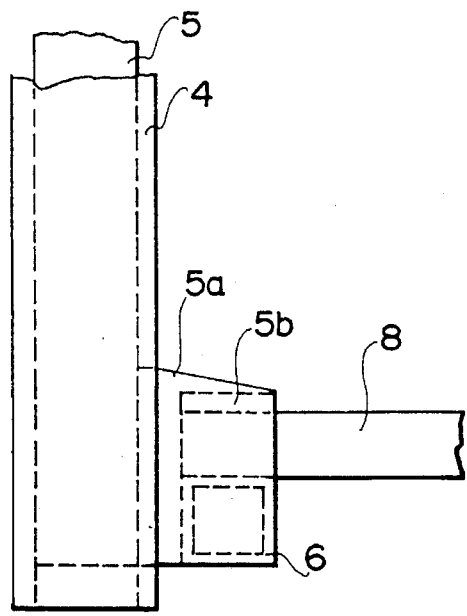
FIGS. 29(A) and 29(B) are views of an essential portion of a load lift in accordance with a fifth embodiment of the present invention.
Figure 29B:
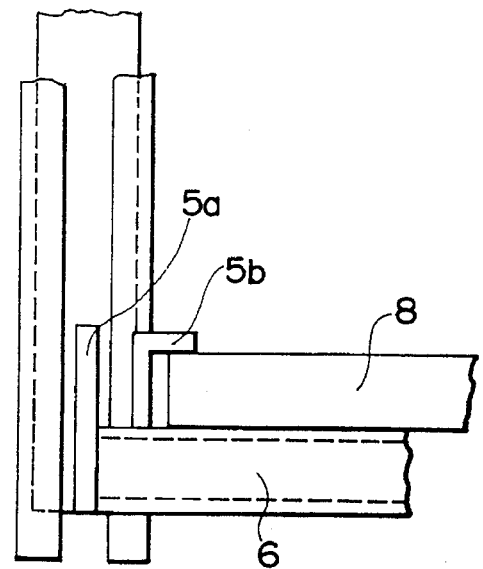

FIGS. 29(A) and 29(B) show a portion of a fifth embodiment of the lift in accordance with the present invention.

In the fifth embodiment, no hanging devices are used. Brackets 5a are provided at lower ends of lifting inner posts 5, and a lifting crossbeam 6 is attached to the brackets 5a. A guide 5b for slidably pinching a lift table 8 is provided on the bracket 5a of each lift inner pole 5. In this arrangement, there is no need to hang a rear end portion of the lift table 8 when the lift table 8 is drawn out.

Figure 30A:
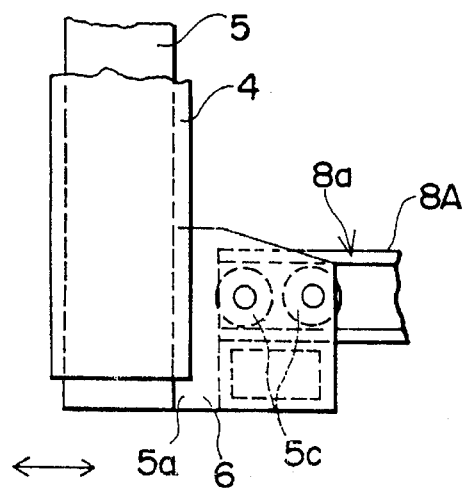
FIGS. 30 (A) and 30 (B) are views of an essential portion of a load lift in accordance with a sixth embodiment of the present invention.
Figure 30B:
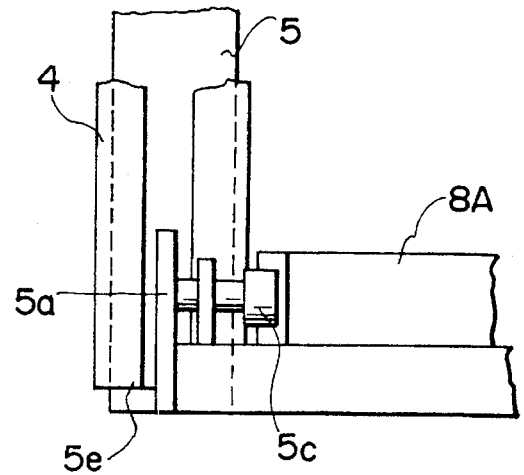

FIGS. 30 (A) and 30 (B) show a portion of a sixth embodiment of the lift in accordance with the present invention.

Also in the sixth embodiment, no hanging devices are used. Rails 8a are formed in side surfaces of a lift table 8A and are engaged with rollers 5c provided on brackets 5a. It is thereby possible for the lift table 8A to be smoothly drawn out.

Figure 31A:
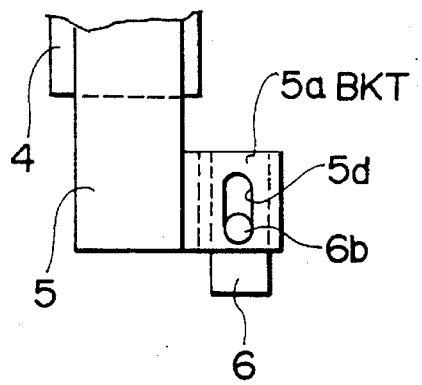
FIGS. 31(A) and 31(B) are views of an essential portion of a load lift in accordance with a seventh embodiment of the present invention.
Figure 31B:
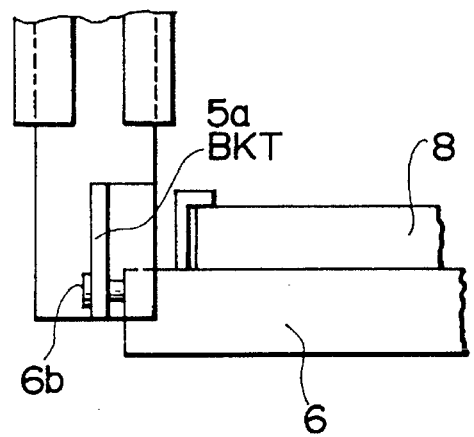

FIGS. 31(A) and 31(B) show a portion of a seventh embodiment of the lift in accordance with the present invention.

In the seventh embodiment, an elongated hole 5d is formed in each of brackets 5a of lifting inner posts 5, and a pin 6b provided on a corresponding side surface of a lifting crossbeam 6 is inserted into the elongated hole 5d. In this arrangement, when the lifting inner posts are moved downward until the lifting crossbeam 6 contacts the ground, the end of the lift table 8 is lifted to an extent corresponding to the size of the elongated hole 5d. The lift table 8 is thereby sloped, so that there is substantially no difference in level from the ground.

Figure 32:
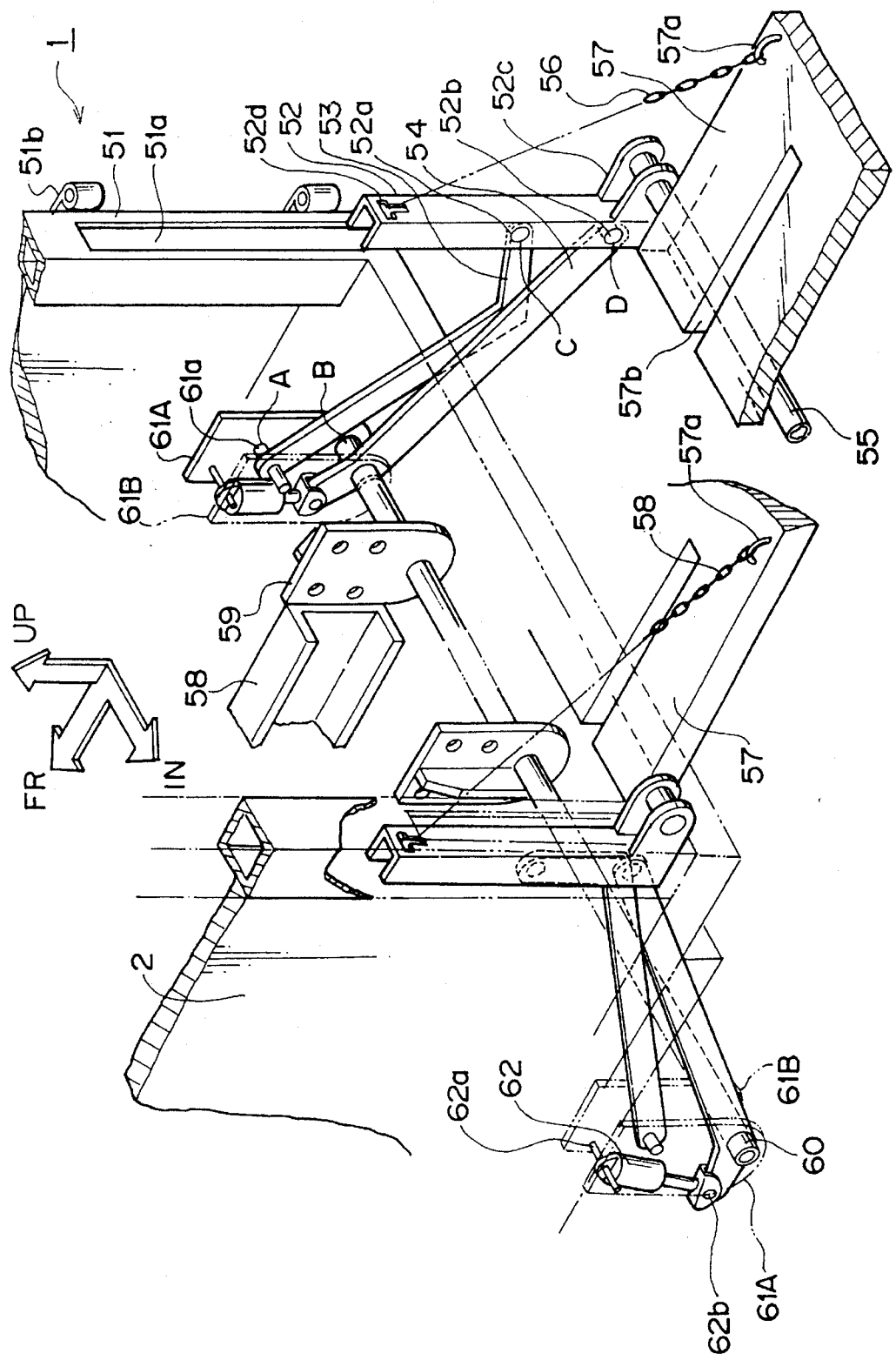
FIGS. 32, 33 and 34 show an eighth embodiment of the lift according to the present invention.
Figure 33:
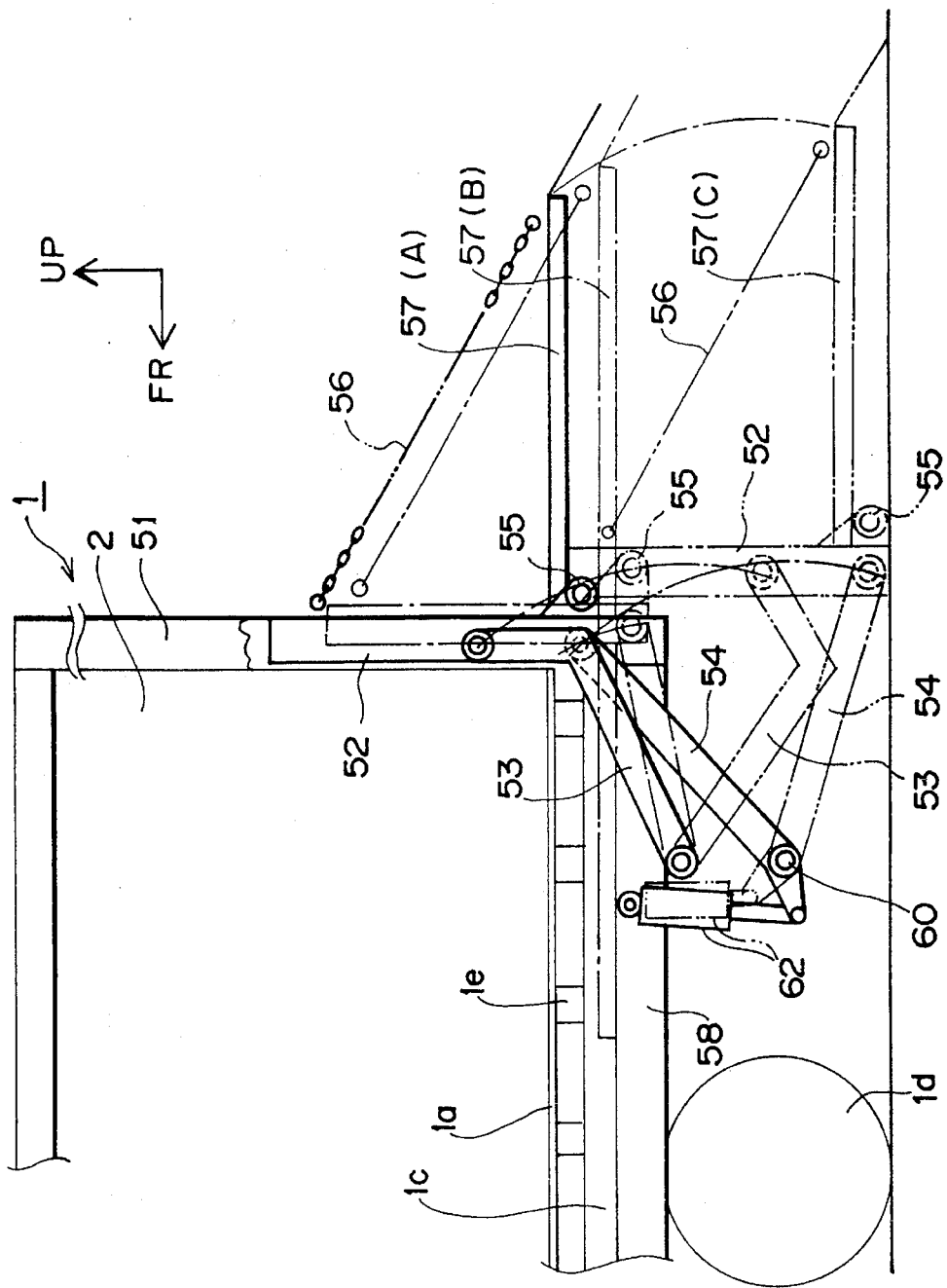
Figure 34:
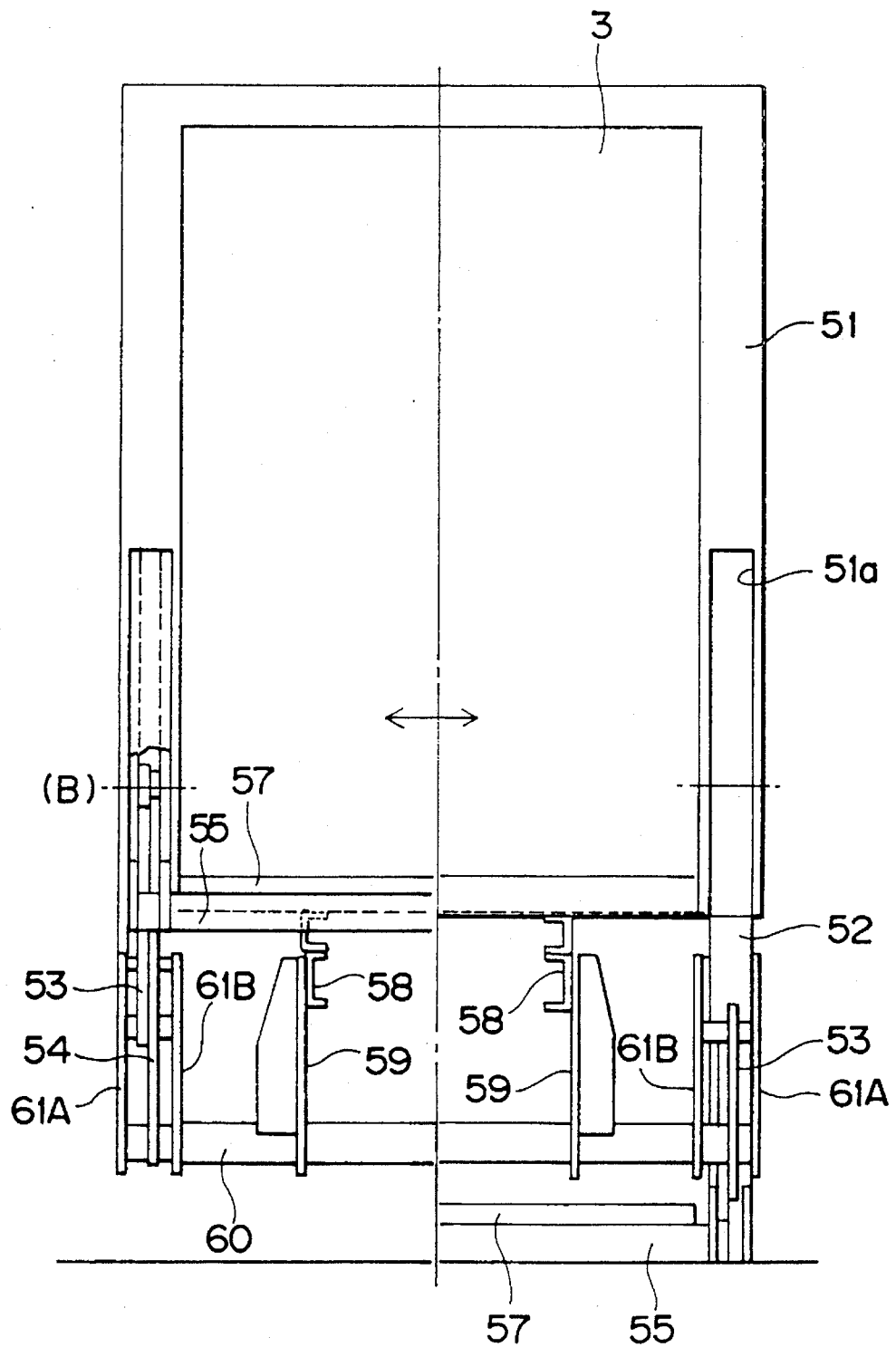

FIGS. 32, 33 and 34 show an eighth embodiment of the lift according to the present invention. FIG. 32 is a perspective view thereof, FIG. 33 is a side view and FIG. 34 is a rear view thereof.

A vehicle 1 of this embodiment has a rear body 2, and gateposts 51 are provided at both right and left sides of the frame. To the gateposts 51 rear doors 3 are mounted by hinges 51b.

In each of the lower portion at the rear side of the gateposts 51 a vertically elongated opening 51a is formed. Right and left support posts 52 are provided for gateposts 51, and the posts 52 move vertically and parallelly with each other by means of upper arms 53 and lower arms 54. When the posts 52 reach upper dead points, they are received into the respective gateposts 51 through the openings 51a.

The posts 52 are connected with a cylindrical connect bar 55 through brackets 52c, which are provided at the rear lower ends of the posts 52, the connect bar 55 being disposed horizontally.

A lift table 57 is used to move with the furnitures, etc. up and down between the ground and a load-carrying platform. The lift table 57 can be drawn out onto the connect bar 55 from its contracted state. On the table 57 there are provided two slits or openings 57b into which webs of longitudinal joists 1c are inserted.

Chains 56 are used to hang the lift table 57, whose lower ends are fixed to anchors 57a. The upper end of each chain 56 is hooked to a T-shaped opening 52d formed on an upper rear surface of the post 52. The chain 56 may be hooked by selecting a link near the upper end of the opening 52d to adjust by pitch the length of the chain. Adjustment of length of the chain 56 results in the adjustment of the tilting angle of the lift table 57. In other words, it is possible to control the rear end of the lift table 57 at the raised or lowered state. As the result, when there is a difference in level between the deck and the platform, the lift table 57 may be utilized as a gangboard.

A support rod 60 is horizontally fixed to the chassis frame 58 of the vehicle 1 through a bracket 59. To both ends of the support rod 60 brackets 61A and 61B consisting of two plates are respectively fixed vertically.

A parallel link is formed with the brackets 61A, 61B, support post 52, upper arm 53 and lower arm 54. Namely, to the support post 52, one end of the upper arm 53 is rotatably mounted through a pin 52a. On the other hand, an end of the lower arm 54 is rotatably mounted to the support post 52 through a pin 52b. The other end of the upper arm 53 is rotatably supported between the brackets 61A and 61B through a pin 61a, while the lower arm 54 is rotatably supported between the brackets 61A and 61B around the support rod 60.

A lift cylinder 62 is to drive the above mentioned parallel link mechanism and its upper end portion is rotatably supported between the brackets 61A and 61B through a pin 62a, while its lower end is supported by the other end of the lower arm 54 through a pin 62b. Therefore, by activating the lift cylinder 62, the post 52 may be moved in a parallel direction while keeping its almost vertical posture so that the lift table 57 is moved vertically between the table position A and C of FIG. 33 through the connect bar 55.

The connect bar 55 connects right and left posts 51 at their respective lower ends, while supporting the fore end of the lift table 57. In this embodiment a cylindrical member (=round pipe) is used. Around the connect bar 55 a pipe-shaped sleeve 55a is rotatably mounted, so that the lift table 57 rolls on the sleeve 55a. Thus drawing out and retraction of the lift table 57 can be made smoothly.

Figure 35:
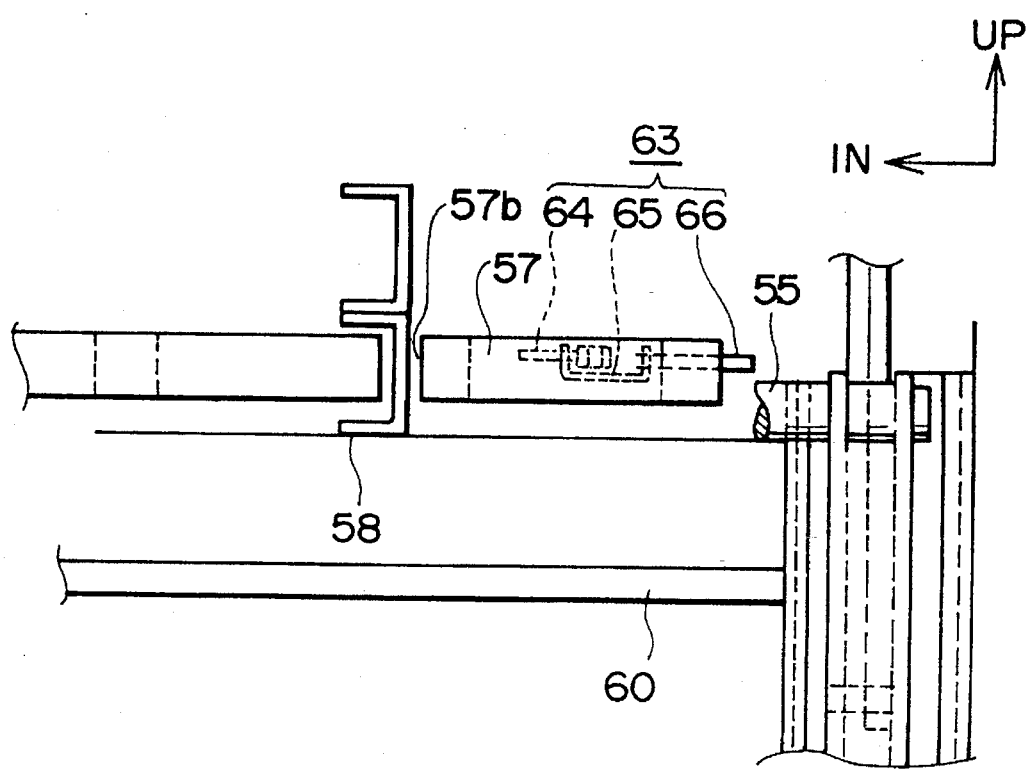
FIGS. 35, 36, 37(A) and 37(B) show lock mechanism used for the eighth embodiment shown in FIGS. 32 through 34.
Figure 36:
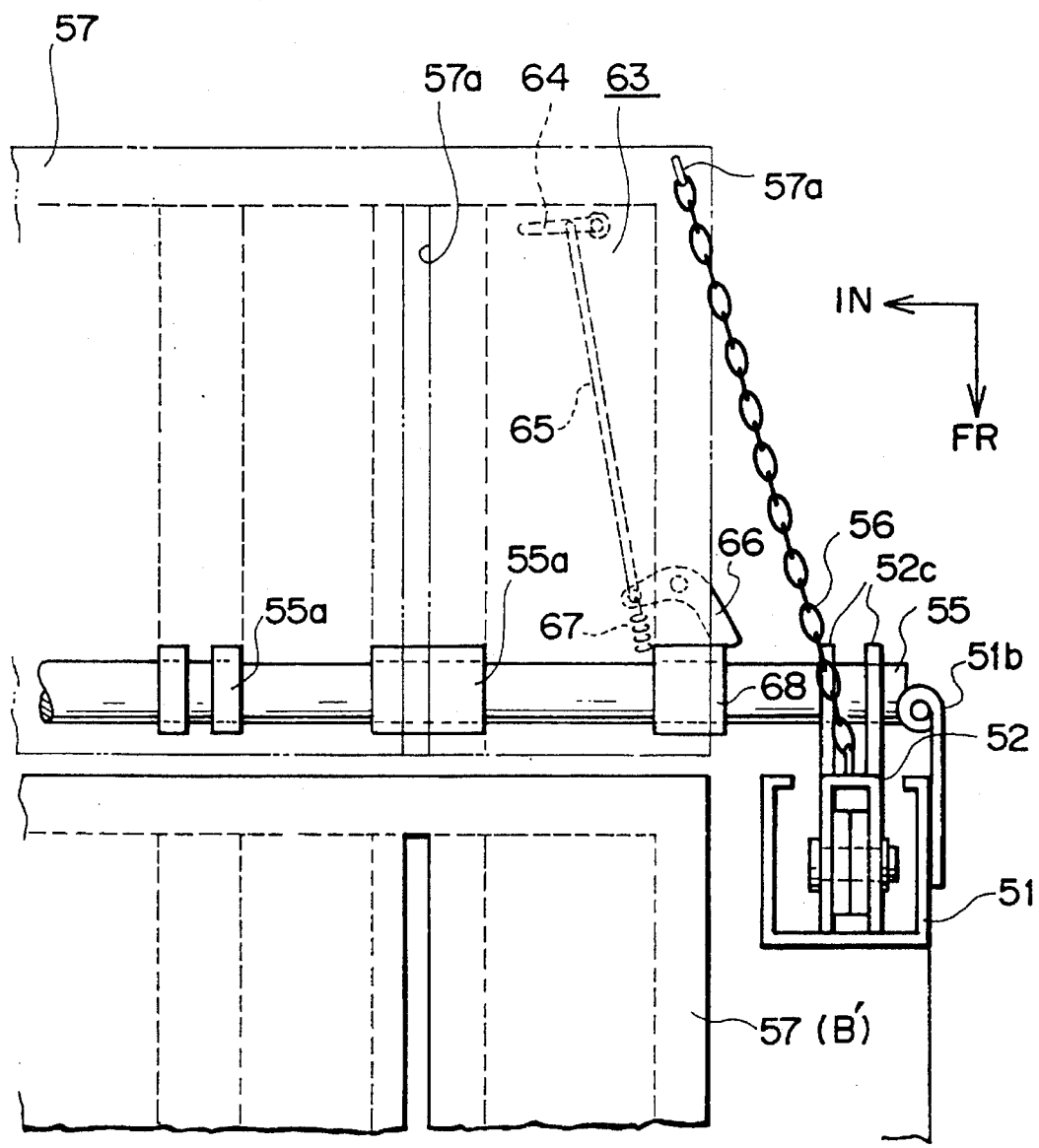
Figure 37A:
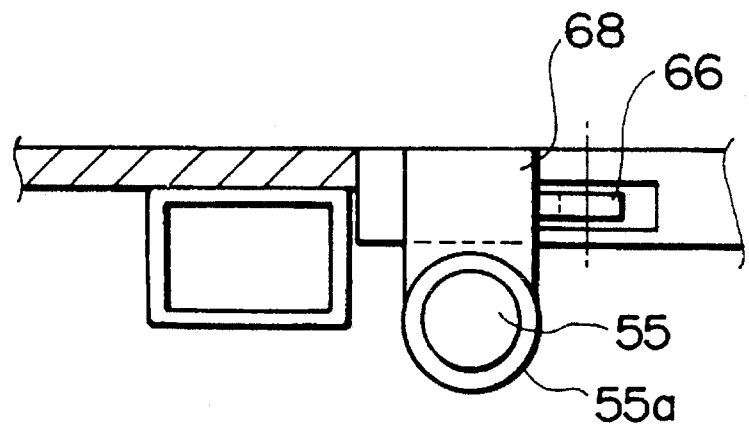
Figure 37B:
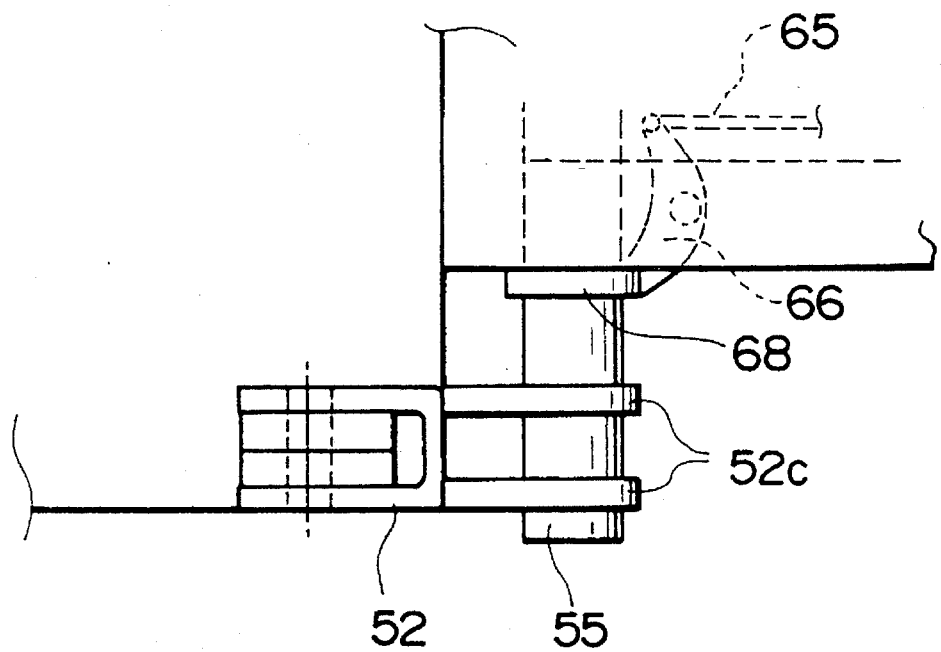

FIGS. 35, 36, 37(A) and 37(B) show the lock mechanism used for the eighth embodiment shown in FIGS. 32 through 34. FIG. 35 is a rear view, FIG. 36 is a plan view, FIG. 37(A) a side view and FIG. 37(B) a partly enlarged plan view.

A lock mechanism 63 is provided inside the lift table 57 and the mechanism 63 is formed of a lever 64 rotatably provided to the lift table 57, a connect bar 65 rotatably provided at its end to the lever 64 to transmit a driving force of the lever 64, a lock ratchet 66 to which the other end of the connect bar 65 is connected and being rotatably mounted to the lift table 57, a spring 67 to urge the lock ratchet 66 in a counterclockwise direction in FIG. 36 and a lock plate 68 provided at the connect bar 55 side and engaged with the lock ratchet 66. With the lock mechanism 63, the lever 64 is rotated in the clockwise direction in FIG. 36 and retracts the lock ratchet 66, so that the lift table 57 may be drawn out. On the other hand, in the state where the lift table 57 is drawn out, the lever 64 is released. By the urging force of the spring 67 the lock ratchet 66 rotates in the anticlockwise direction in FIG. 36 and engages with the lock plate 68, so that the lift table 57 is then locked.

The operation of the lift of this embodiment will now be explained.

When the lift of this embodiment is used, the rear doors 3 of the vehicle 1 are first swung on hinges 51b provided at outer corners of the gateposts 51 to be open by about 260°.

Next, at the table position B shown in FIGS. 33 and 34, the lock mechanism 63 (FIG. 35) placed inside the lift table 57 is unlocked and the lift table 57 is drawn out to a position at the rear of the rear body 2.

When the lift table 57 is drawn out to the maximum extent, the fore end of the lift table 57 is on the connect bar 55 and is not protruding forward beyond the rear end surface of the support post 52. In this state, the table 57 is automatically locked and is prevented from returning.

At this time, the upper end of the chain 56 is inserted into the T-shaped opening 52d of the support post 52 to hang and support the rear end of the lift table 57.

Next, the lift cylinder 62 is extended to move the upper and lower arms 53 and 54 to upper dead point of the movable range, namely to the table position A of the lift table 57. At this position, the lift table 57 is flush with the surface of the deck 1a as shown in FIG. 33.

Then, properties in the rear body 2 are moved on the lift table 57 and the lift cylinder 62 is contracted. As the result, the support post 52 supported by the upper and lower arms 53, 54 moves downward, while keeping the parallel relation (by parallel link mechanism) and reaches the table position C. During the movement, a post 52 keeps the vertical posture, and so the lift table 57 stays in a horizontal state, so as not to drop the properties by slippage.

When the properties are put into the vehicle 1, they are first put on the lift table 57 and the table is moved from C to A position to put them into the rear body 2.

In order to retract the lift table 57, it is moved to the position B and the lock mechanism 63 is unlocked. The table 57 is then pushed forward to the position B' as shown in FIG. 36. At the position where the lift table 57 protrudes rearwardly from the support bar 60, the lock mechanism 63 operates to lock the table 57.

Since slits or openings 57b are formed in the lift table 57, the table may be inserted without interfering with the chassis frame 1b or longitudinal joists 1c.

The lift table 57 is thus contracted and held in the forward position under the deck through the space above the tires 1d of the vehicle 1. Therefore, the length of the lift table 57 may be made longer. Even in such a case, the fore end of the table 57 is supported by the connect bar 55 and the rear end is supported by chains 56. Thus the strength of the table 57 is sufficient enough compared with other prior art cantilever supports. The system can therefore be made light-weight.

Figure 38:
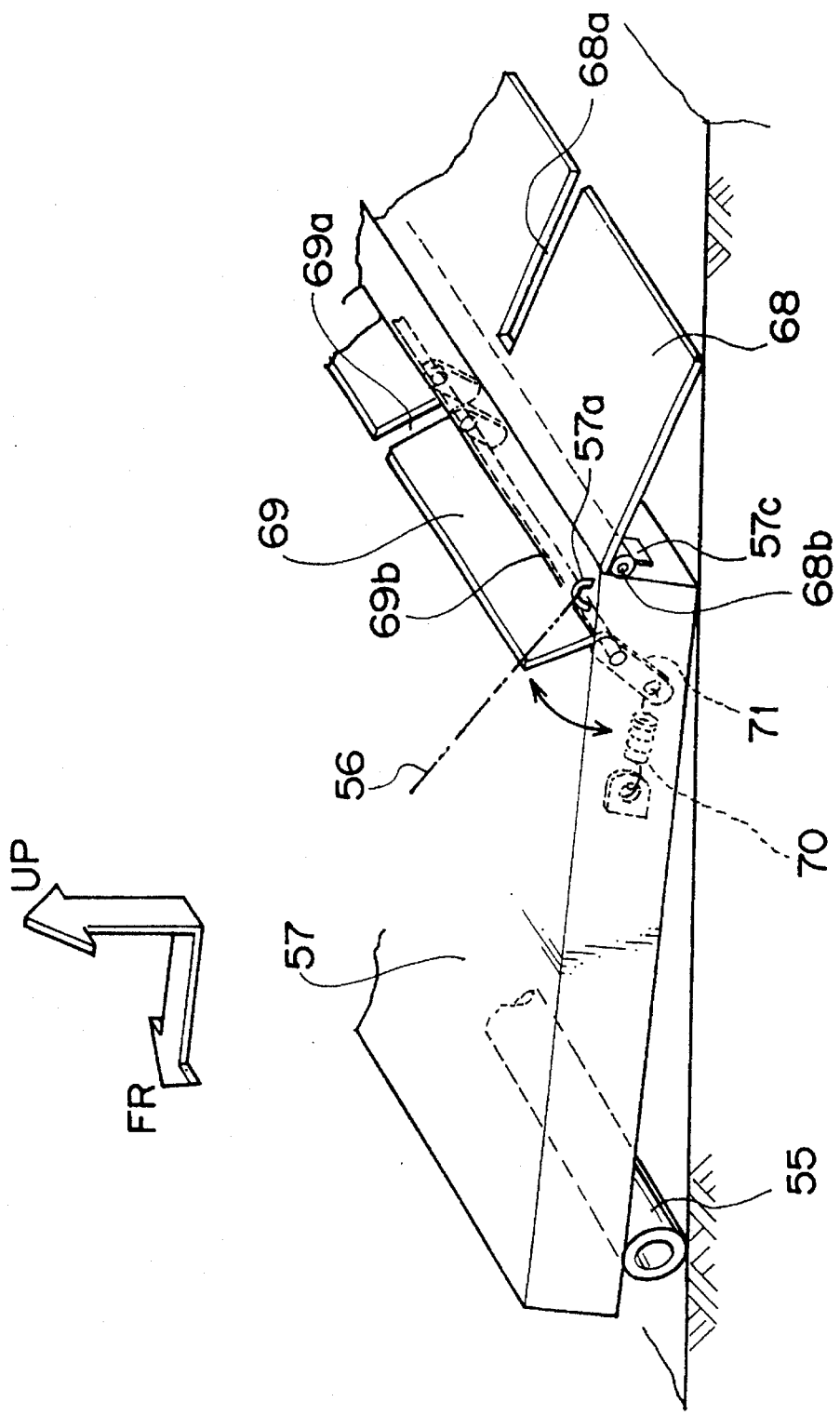
FIG. 38 is a perspective view of a ninth embodiment of the lift according to the present invention.

FIG. 38 is a perspective view of a ninth embodiment of the lift according to the present invention. Identical portions used for the lift of the eighth embodiment are shown with identical numerals.

In the lift of the eighth embodiment explained above, the lift table 57 is explained to be supported almost horizontally. However, it is preferable when a load box with castor wheels is used that the lift table is sloped toward the rear end at the time of grounding. However, when the lift table 57 is sloped toward the rear end, the load box with castor wheels might be slipped away from the sloped table 57 at the time of its moving up and down operation. In the ninth embodiment of the lift of the present invention, a mechanism for safely and easily moving up and down the load box with castor wheels has been proposed.

In the lift according to this embodiment of the present invention, a gangboard 68 and a castor stopper 69 are provided to the lift table 57 rotatably around shafts 68b and 69b, respectively. In the gangboard 68 and the castor stopper 69, slits 68a and 69a are respectively formed in the positions corresponding to the slits 57a of the lift table 57.

The castor stopper 69 is urged in its rising direction (as shown in FIG. 38) by a spring 70 through a lever 71.

When the lift table 57 is contracted, the gangboard 68 is raised and swung onto the lift table 57. At this time, the castor stopper 69 is pressed by the weight of the gangboard 68 and is put between the upper surface of the lift table 57 and the gangboard 68.

By changing the length of the chains 56, the upper surface of the lift table 57 may be sloped at the rear end at the time of grounding (lower dead point of upper arm 53 and lower arm 54) so that the rear end of the gangboard 68 smoothly grounds.

The gangboard 68 contacts a stopper 57c of the lift table 57 and stops with the rearwardly sloping state. When the load box with castor wheels containing furnitures and properties is put on the table, the castor wheels after passing on the gangboard 68 move over the castor stopper 69 by pushing it onto the lift table 57. After the wheels move over the castor stopper 69, the stopper 69 rises by means of the spring 70 to prevent the castor wheels from slipping off from the lift table 57.

Figure 39:
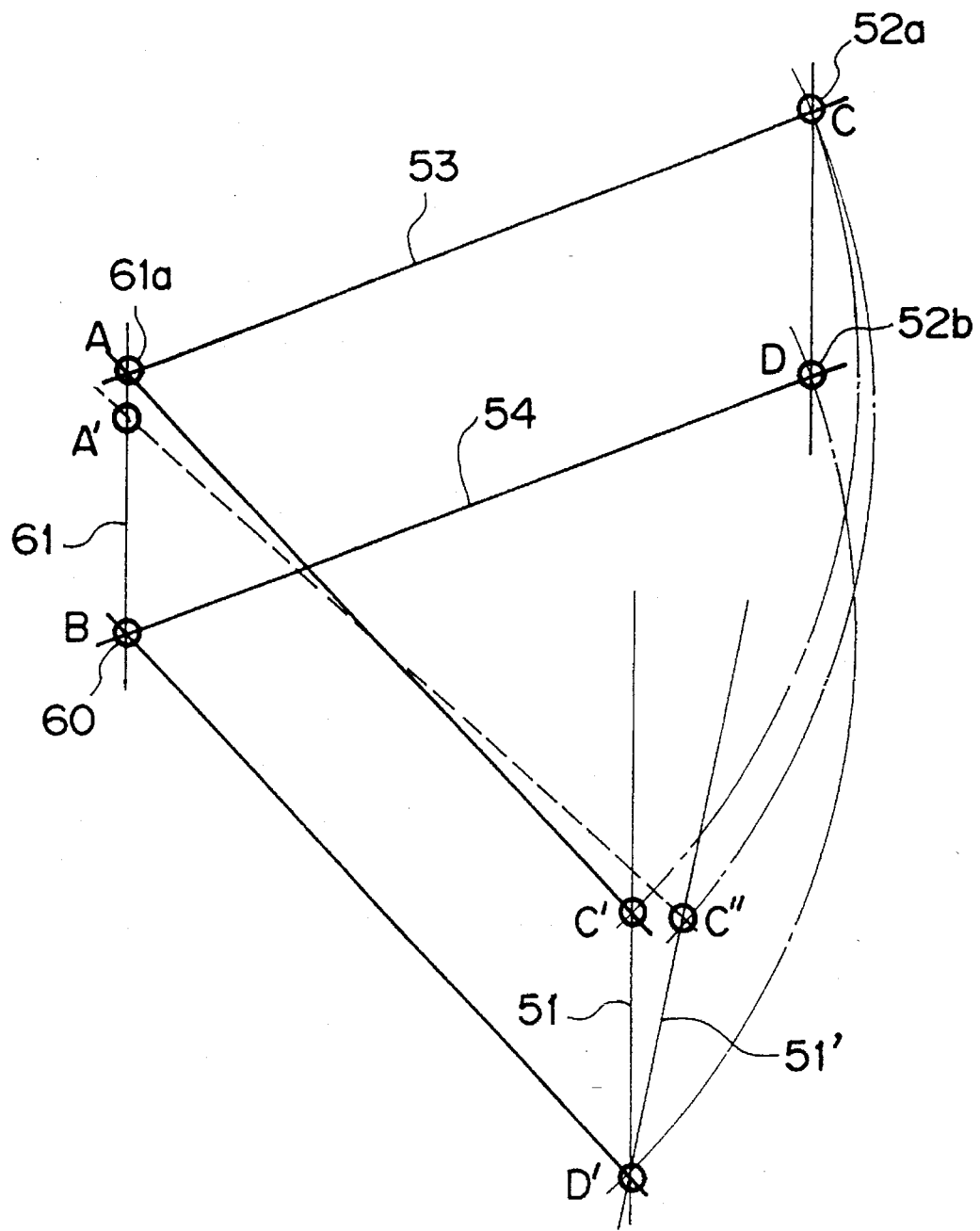
FIG. 39 is a view which shows a part of the lift of a tenth embodiment of the present invention.

FIG. 39 is a view which shows a part of the lift of a tenth embodiment of the present invention.

In the eighth and ninth embodiments of the present invention, assume that the position of the pin 61a, which is a shaft of the upper arm 53 or lower arm 54, is A, the position of the support lever 60 is B, C for the position of the pin 52a and the position of the pin 52b is made D. The length of the line AB equals lines CD and C'D'. The lines AB, CD and C'D' are almost parallel with each other.

The lift table 57, if it is made sloped down at its rear end at the time of grounding, is sloped even at the table position A.

In the tenth embodiment, the length of the line AB has been made slightly shorter to A'B. In other words, the position of pin 61a of the upper arm 53 is displaced downwardly. Therefore, the lines A'B and CD are almost parallel with each other, but lines A'B and C"D are not parallel and the point C" is displaced rearwardly from the point C'.

With this structure, even by setting the lines A'B and CD parallel with the gatepost 51, the line C"D' is not parallel therewith. The upper portion of the gatepost 51 tilts in the rear direction. Thus the rear of the lift table 57 grounds simultaneously with the connect bar 55.

Thus, in the tenth embodiment, the lift table 57 is parallel with the deck 1a at the table position A but at the position C the rear portion of the upper surface of the lift table 57 is sloped downward, so that the grounding becomes easy.

Figure 40:
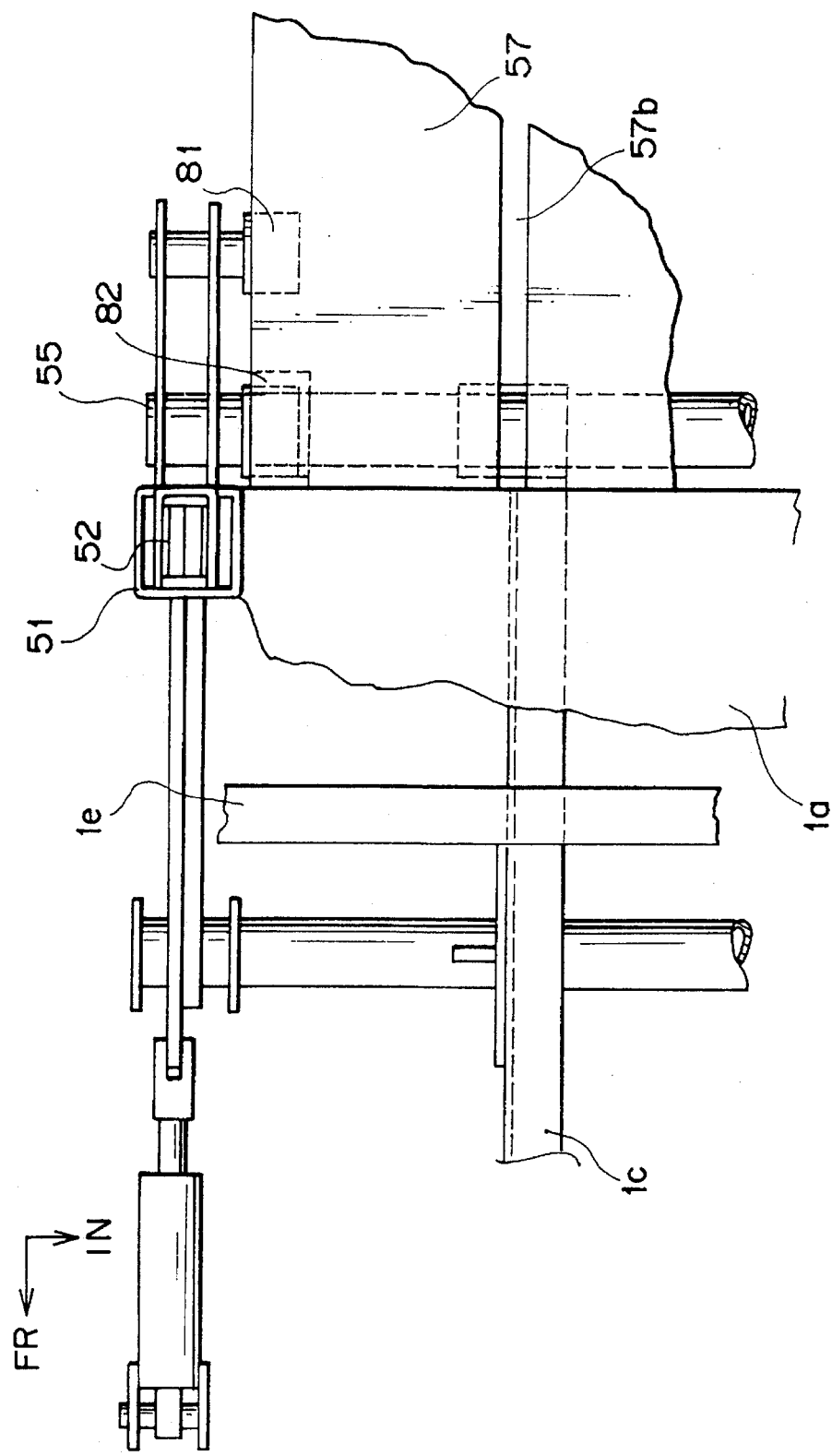
FIGS. 40 through 42 show an eleventh embodiment of the lift according to the present invention.
Figure 41:
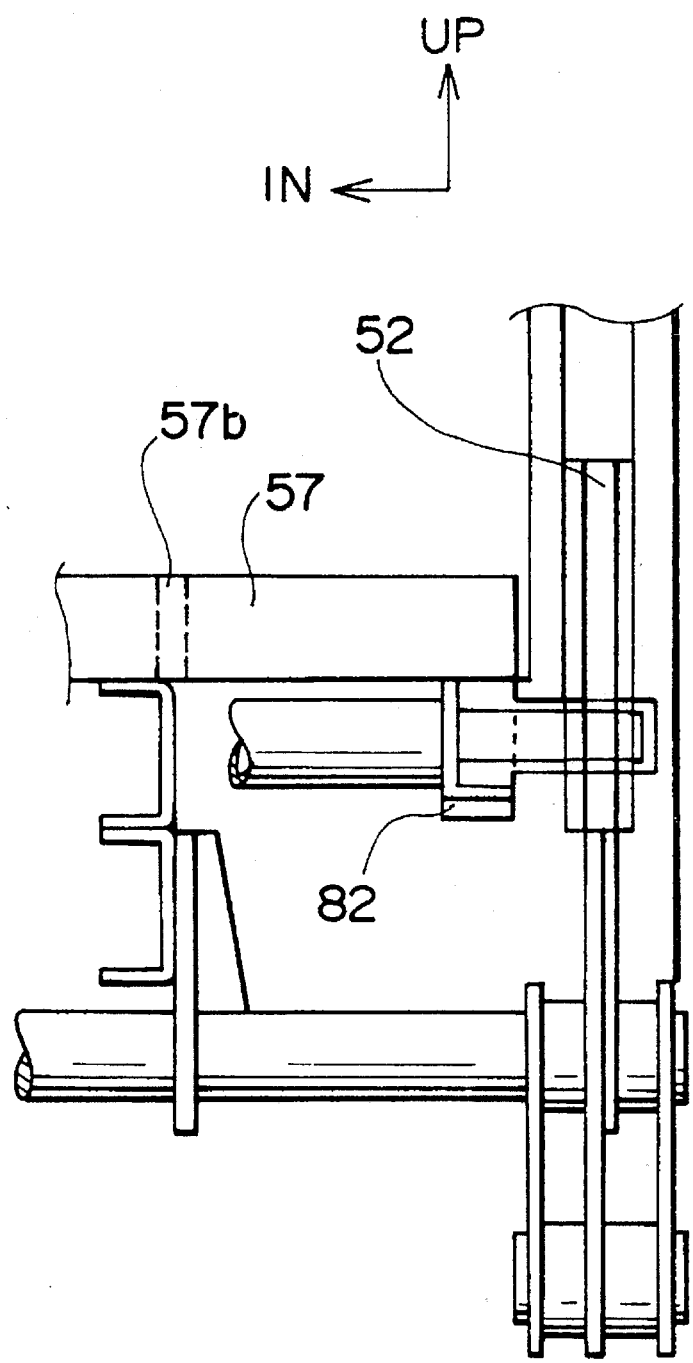
Figure 42:
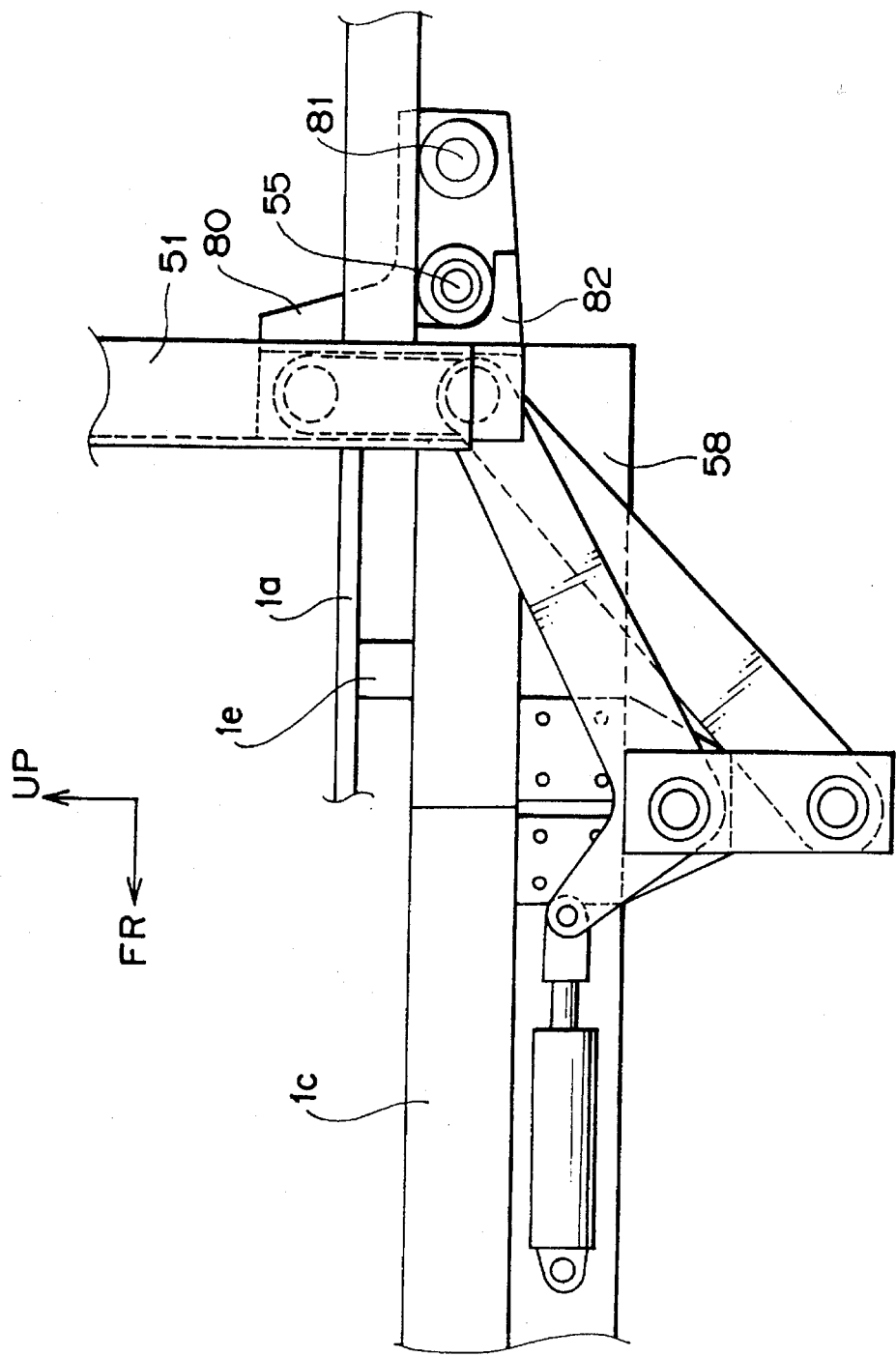

FIGS. 40 through 42 show an eleventh embodiment of the lift according to the present invention. FIG. 40 is a plan view, FIG. 41 a rear view and FIG. 42 a side view of the lift of the eleventh embodiment.

In the lift of the eighth embodiment, the lift table 57 is hung at its rear ends by chains 56. On the other hand, in this eleventh embodiment an L-shaped bracket 80 is mounted to the support post 52 and the connect bar 55 is provided. At the rear side of the lift a roller 81 is rotatably provided. In the front portion of the lift table 57 there is provided a grip 82 and the connect bar 55 is hung by the grip 82.

According to the eleventh embodiment, chains 56 are not necessary-and further the sides of the lift table 57 are open, so that loading and unloading of load box(es) and other furnitures and goods from the sides of the table 57 is possible.

Figure 43:
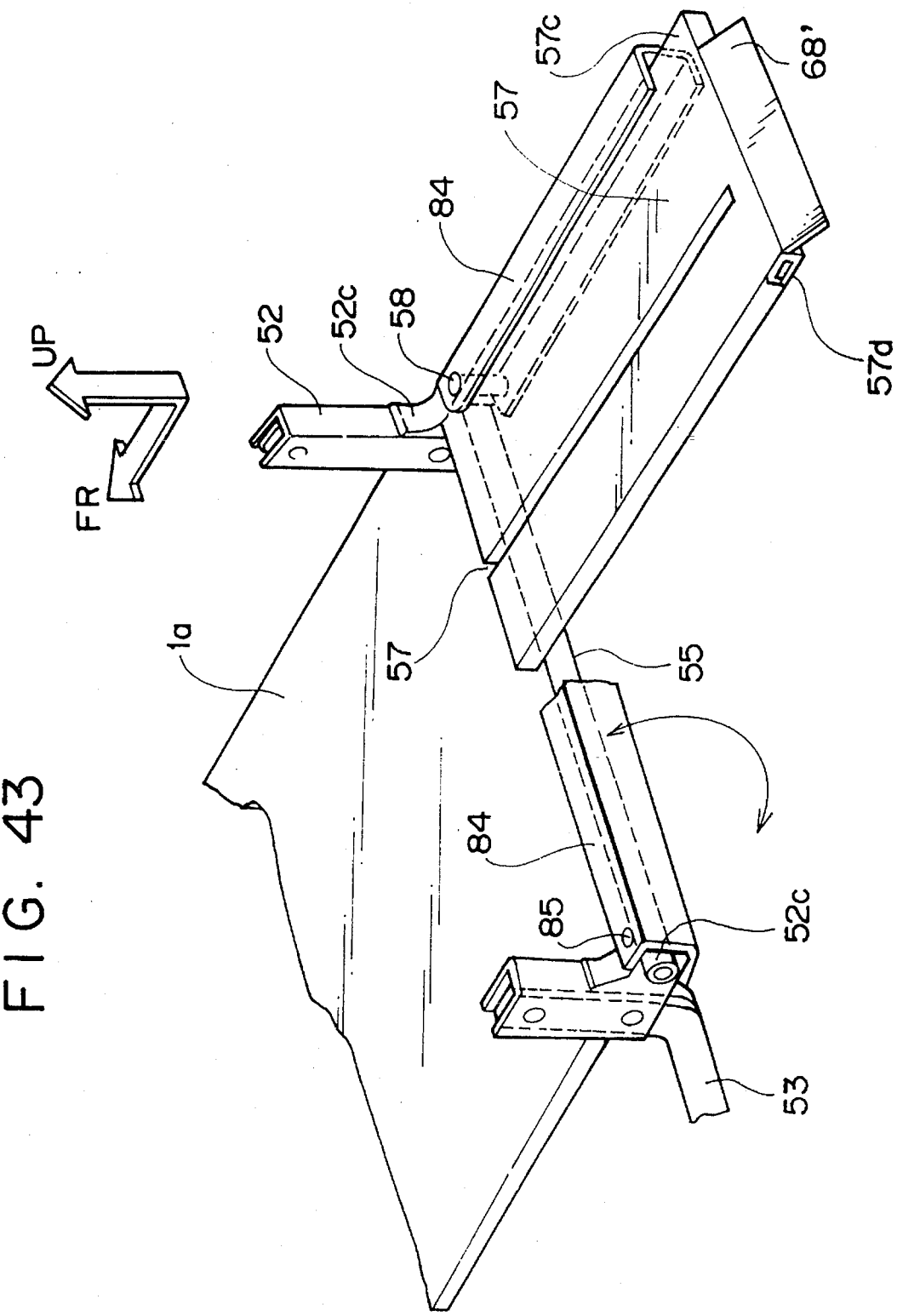
FIG. 43 is a perspective view of a twelfth embodiment of the lift according to the present invention.

FIG. 43 is a twelfth embodiment of the lift according to the present invention.

In this embodiment, brackets 52c are provided in the lower portion of the right and left support posts 52, and rails 84 are respectively mounted, whose section is of U shape, to the brackets 52c through pins 85, respectively. The rails 84 are rotatable in a horizontal plane. The rail 84, when the lift table 57 is contracted into the underside of the deck 1a, is rotated as shown in the left side of FIG. 43, so that it is parallel with the connect bar 55 as if it holds the connect bar 55. When the lift table 57 is drawn out, the rail 84 is rotated until it is almost at a right angle with respect to the connect bar 55 as shown in the right hand side of FIG. 43. Then an outermost frame member 57c of the table 57 is inserted into the inside groove of the rail 84. The right and left rails 84 work as a guide for drawing out the table. Therefore, the lift table 57 is put between the rails 84 and its lateral displacement is prevented.

According to the lift of the twelfth embodiment, the outermost frame members 57c of the lift table 57 are supported by the rails 84, and the table 57 is protected from bending. Therefore, the lift table 57 is protected at its forward end by the connect bar 55, and at the rear end by lateral frame member 57d of the table 57, to provide the both end support type.

When the lift table 57 is used, it may be drawn out by just opening the rails 84 to left and right by about 90°. The weight of the table 57 is received and supported by the rails 84 and so the lift table 57 may be drawn out without raising it for drawing it.

When the lift table 57 and the rails 84 are contracted as shown in the left of FIG. 43, the rails 84 may be used as steps for the driver.

In the twelfth embodiment, the fore side of the lift table 57 moves upward from the connect bar 55 and so the grip 82 as used in the eleventh embodiment is not required.

FIG. 44 is a portion of a thirteenth embodiment of the lift according to the present invention.

In the lift of the thirteenth embodiment, there are provided ball castors 86 at the rear portion of the sides of the lift table 57. Inside the rails 84 are provided guides 87 and guide grooves 88, which work as lateral and vertical guides. Simultaneously the ball castors 86 drop into the guide grooves 88 acting as engaging holes when the lift table: 57 is drawn out to the maximum extent. With this structure, the lift table 57 is automatically locked. Thus in this embodiment a special locking means as in FIG. 37 is not required.

By using the locking means as shown, the rear end of the lift table 57 at first grounds and after that, when the rails 84 reach the ground, the lift table 57 does not receive any objectionable weight. In place of ball castors 86, roller means can be used.

The present invention is not limited to the above-described embodiments and can be modified in various ways.

For example, while an extension type hanging device is used in the first embodiment, a hanging device having a detachable connection to the lift table may be used. Such a hanging device can have a constant length.

Also, a wire rope has been described as an example of an extension type hanging device. Alternatively, a hanging device formed of a chain or a belt or a hanging device using a rod or a link may be used.

In the first through seventh embodiments, as a slack absorbing means, a device capable of winding up a wire rope or the like by a reel spring may be used.

In the first embodiment, the inner panels are upwardly swung toward the outer panels. Conversely, the outer panels may be swung toward the inner panels. Ordinarily, the arrangement of swinging the inner panels toward the outer panels is suitable because the space between the longitudinal joists is used to accommodate a gangboard, a hand truck, a ladder or the like. In this case, however, a substantially larger spacing is required between the rear tires and the lower surface of the lift table when the lift table is retracted, and the ground clearance is increased, because the rear tires are displaced in a vertical direction by deflection of suspension springs. If an arrangement for swinging the outer panels toward the inner panels is adopted, the ground clearance can be reduced although the accommodation space is removed.

In the second embodiment, slits 21 are closed with slit covers 22. However, the actual slit width may be set to the sum of the thickness of a longitudinal joist plate and a certain clearance (e.g., 10 mm), and there is no considerable problem even if no slit covers are used.

A truck capable of being used as both house-moving trucks with lifts popularly used in Japan at present and separate small-lot package delivery vehicles also popularly used in Japan can be provided by using the above-described load lift.

That is, if the lift in accordance with the present invention is provided on a small separate-delivery vehicle, the small separate-delivery vehicle can be also used to collect/deliver properties to be moved in its service area.

This effect of the present invention that small separate-delivery vehicles having the lift of the present invention can cover a part of the house-moving field may greatly contribute to an economical improvement in transportations suffering from a serious lack of labor and aggravation of traffic circumstances.

The lift shown in the eighth through thirteenth embodiments is fixed only to the chassis frame. The entire lift is formed independently from the rear body. Therefore, the lift may be mounted to the chassis and thereafter the rear body may be built on the chassis. Therefore if a space is kept for receiving the support post, the lift of the present invention can be mounted to any type of bodies, as fire fight car, mixer, etc.

According to the present invention, as described above in detail, a lift having a sufficiently large lift table can be mounted on a vehicle having a small deck length without remodeling the vehicle. Also, when the lift is retracted, the deck can be freely loaded or unloaded only by opening the rear doors without operating the lift. The lift is easy to operate and has a sufficiently strong structure.

In the first through seventh embodiments, a wire rope is used as means for hanging the lift table by connecting an end of a drive means and a rear portion of the lift table, and the end of the drive means can operate with a certain play in the direction of a vertical stroke of the lift inner poles by the effect of a play means. Therefore, the lift table can be swung to reduce the difference in level from the ground, and a box with castor wheels can be easily placed on the lift table.

Further, a slack absorbing means is provided to absorb slack of the wire rope by tensioning the wire rope when the lift table is retracted. The wire rope is thereby prevented from being excessively slacked when the lift table is slid.

In the eighth through thirteenth embodiments, the support posts are connected with a connecting member and the lift table with slips are slidably inserted in the longitudinal direction. The lift may be inserted to retreat under the rear body without interfering with the chassis frame or longitudinal joists. Therefore, the lift may be mounted without applying any additional remodelling to the ordinary vehicle.

The support posts are moved up and down by means of a parallel link mechanism consisting of the support members, and first and second arm members. By the swinging operation of the first and second arms the support posts move outside of the gateposts keeping at almost a right angle, so that at the upper position of the upper dead point, the fore end of the lift table 57 stops contacting the rear end of the deck 1a. The loading and unloading of the heavy thing may be made smoothly.

By means of a sleeve around the connect member, the lift table 57 rolls on the connect member so that the drawing out and retracting operation of the lift table may be made easily.

By the use of the hanging members, when the lift table is drawn out, it may be kept almost horizontally. By adjusting the length of the hanging members, the lift table may be made sloped at the rear portion thereof upwardly or downwardly.

In the eighth through thirteenth embodiments, arm members are provided, in order to support the lift table, to both sides of the connecting members, the arm members protruding rearwardly. The table may be supported from the sides and rear ends thereof. Thus the hanging means is not required. Moreover, the sides of the lift table are open. The strength is improved. Further, the arm members work as guides so that the drawing out and retraction of the lift table can be made smoothly.

As shown in the Figures, in all of the embodiments the panels formed by the slots within the lift table are integrally connected together only at the rear portion of the lift table.

What is claimed is:

1. A lift for loading and unloading a truck, having a rear end, sides, a chassis, and a loading chamber having a floor defining a plane, said lift comprising:

movable support posts mounted adjacent the rear-end and at each side of the truck;

drive means for moving said support posts in a direction substantially perpendicular to the plane;

a lift table having at least one slit therethrough substantially in registration with One of a chassis frame and a longitudinal joist, the at least one slit having a width slightly larger than a thickness of a web portion of the one of the chassis frame and longitudinal joist and extending from a front end of said lift table relative to a forward end of the truck toward a rear portion of said lift table so that said lift table is divided into a plurality of panels each integrally connected together only at the rear portion of said lift table; and support means for supporting said lift table substantially parallel to the plane when said lift table is in a drawn out position, said support means comprising:

a connecting member connecting a lower end of each support post and supporting essentially the entire front end of said lift table; and means for connecting a respective side of said lift table with a respective movable support post so that said movable support posts support both respective sides of said lift table.

2. A lift as defined in claim 1, the truck further having right and left gate posts located on the rear-end and at each side of the truck, the floor having a rear edge corresponding to the rear-end of the truck, wherein said support posts are located and movable within the gate posts, and said connecting member is located adjacent the rear edge of the floor.

3. A lift according to claim 2, wherein the panels of the lift table form a first pair of panels, the lift table further including two additional panels forming a second pair of panels, one of said first and second pairs of panels being inner panels and the other of said first and second pairs of panels being outer panels, the lift table further having respective side and rear frame members, the lift table being retracted under the floor of the loading chamber by upwardly swinging the pair of inner panels and superimposing the inner panels on the pair of outer panels fixed to the side and rear frame members, or by upwardly swinging the pair of outer panels and superimposing the outer panels on the inner panels fixed to the side and rear frame members.

4. A lift according to claim 2, wherein said means for connecting comprises a hanging device for hanging the rear portion of the lift table on the support posts.

5. A lift according to claim 4, wherein the hanging device is of an extension type.

6. A lift according to claim 4, wherein the hanging device comprises a wire rope connecting an extreme end of the drive means and the rear portion of the lift table.

7. A lift according to claim 6, further comprising play means for providing a certain play at the extreme end of the drive means in a direction along a vertical stroke of the support posts to enable the lift table to swing.

8. A lift according to claim 7, further comprising slack absorbing means for absorbing a slack of the wire rope by tensioning the wire rope by a certain stroke when the lift table is retracted.

9. A lift according to claim 6, further comprising slack absorbing means for absorbing a slack of the wire rope by tensioning the wire rope by a certain stroke when the lift table is retracted.

10. A lift to claim 3, wherein the means for connecting comprises a hanging device for hanging the rear portion of the lift table on the support posts.

11. A lift as defined in claim 20 further comprising:

plural support members attached to the chassis frame;

at least one pair of first and second arm members forming a parallel link mechanism, one end of each arm member being connected to a respective support post, the other end of each arm member being connected to a respective support member, each connection comprising a pivotal shaft-type connection being separated from adjacent connections by a predetermined distance; wherein said drive means drives at least one of said support posts and said parallel link mechanism.

12. A lift according to claim 11, wherein the distance between the shaft-type connections at the support members is made shorter than that between the support posts, so that the support posts when raised keep approximately a vertical posture relative to the plane, and when lowered tilt in a rear direction.

13. A lift according to claim 12, wherein a sleeve is rotatably provided to the connecting member and contacts the lift table while rolling.

14. A lift according to claim 11, wherein a sleeve is rotatably provided to the connecting member and contacts the lift table while rolling.

15. A lift according to claim 11, wherein said means for connecting comprises a hanging member provided to hang from the support post a rear end of the lift table.

16. A lift table according to claim 15, wherein said handing member is adjustable in length.

17. A lift as defined in claim 1, wherein said connecting member has plural ends, the means for connecting comprising a respective rearwardly protruding arm connected at each end of said connecting member for supporting said lift table.

18. A lift according to claim 17, wherein the arms are provided rotatably at both sides of the connecting member, the arms are parallel with the connecting member at the time of contracting the lift table and approximately at a right angle with respect to the connecting member when the table is drawn out.

19. A lift according to claim 18, wherein the arms have a U-shape cross-section which holds the sides of the lift table.

20. A lift according to claim 19, wherein at least one of balls and rollers are provided at the rear portion of the lift table, while guides are provided within the arms and having engaging holes at the ends of the guides so that at least one of the balls and rollers are engaged with the engaging holes to lock the lift table at the time the lift table is drawn out at its maximum extent.

21. In a lift for loading and unloading a truck comprising:

support posts mounted at both sides of a rear end of a rear body;

drive means for moving upward and downward the support posts;

a lift table having a slit formed therethrough in a portion corresponding to one of a chassis frame and a longitudinal joist, the slit defining a width slightly larger than a thickness of a web portion of the one of the chassis frame and longitudinal joist and extending from a front end of said lift table relative to a forward end of the truck toward a rear portion of said lift table so that said lift table is divided into a plurality of panels each integrally connected together only at the rear portion of said lift table; and support means for supporting the lift table comprising:

a connecting member extending in a longitudinal direction and connecting lower ends of the support posts to support esssentially the entire front end of said lift table when said lift table is in a drawn out position, said lift table being slidable on the connecting member in a direction transverse to the longitudinal direction of the connecting member; and arms connected to the support posts and provided at both sides of the connecting member as to protrude rearwardly, the arms supporting sides of the lift table.

22. A lift for loading and unloading a truck, having a rear end, sides, a chassis, and a loading chamber having a floor defining a plane, said lift comprising:

movable support posts mounted adjacent the rear-end and at each side of the truck;

a connecting member having plural ends each connected to a lower end of a respective support post;

drive means for moving said support posts in a direction substantially perpendicular to the plane;

a lift table having a slit therethrough substantially in registration with the chassis frame, said lift table being supported by said connecting member and slidable on said connecting member in a direction parallel to the plane; and a respective rearwardly protruding arm pivotally connected at each end of said connecting member for supporting said lift table, each said arm having a U-shaped cross-section for accommodating a respective side of said lift table, said arms being parallel with said connecting member when said lift table is contracted and being at an approximate right angle relative to said connecting member when said lift table is drawn out.

23. A lift as defined in claim 22, wherein said lift table includes at least one of a plurality of balls and rollers provided at a rear end of said lift table, said arms including guides and engaging holes at respective ends of the guides, said at least one of the plurality of balls and rollers engaging with the engaging holes when said lift table is drawn out to lock said lift table in position.

* * * * *